(12) United States Patent
Kajita

(10) Patent No.: US 11,526,010 B2
(45) Date of Patent: Dec. 13, 2022

(54) HEAD MOUNTED DISPLAY DEVICE, METHOD OF CONTROLLING HEAD MOUNTED DISPLAY DEVICE, SYSTEM, SYNCHRONOUS CONTROL APPARATUS, AND METHOD OF CONTROLLING SYNCHRONOUS CONTROL APPARATUS

(71) Applicant: CANON KABUSHIKI KAISHA, Tokyo (JP)

(72) Inventor: Yoshiki Kajita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/153,373

(22) Filed: Jan. 20, 2021

(65) Prior Publication Data

US 2021/0231950 A1 Jul. 29, 2021

(30) Foreign Application Priority Data

Jan. 23, 2020 (JP) .............................. JP2020-009447

(51) Int. Cl.
| | |
|---|---|
| *G02B 27/01* | (2006.01) |
| *H04N 5/232* | (2006.01) |
| *G02B 27/00* | (2006.01) |
| *G06T 19/00* | (2011.01) |

(52) U.S. Cl.
CPC ..... *G02B 27/0101* (2013.01); *G02B 27/0093* (2013.01); *G02B 27/0172* (2013.01); *G06T 19/006* (2013.01); *H04N 5/232* (2013.01); *G02B 2027/014* (2013.01); *G02B 2027/0138* (2013.01); *G02B 2027/0178* (2013.01)

(58) Field of Classification Search
CPC ............ G02B 27/0101; G02B 27/0093; G02B 27/0172; G02B 27/0138; G02B 27/014; G02B 27/0178; G06T 19/006; H04N 5/232
See application file for complete search history.

(56) References Cited

U.S. PATENT DOCUMENTS

2022/0051441 A1* 2/2022 Zahnert ..................... G06T 7/73

FOREIGN PATENT DOCUMENTS

| JP | 2000-341719 A | 12/2000 |
|---|---|---|
| JP | 2006-005608 A | 1/2006 |

* cited by examiner

*Primary Examiner* — Robert J Michaud
(74) *Attorney, Agent, or Firm* — Carter, DeLuca & Farrell LLP

(57) ABSTRACT

A head mounted display device including a first image capturing unit and a second image capturing unit different from the first image capturing unit comprises a first generation unit configured to generate, based on a signal representing an image output timing of the first image capturing unit, a first signal for controlling a start of exposure of the second image capturing unit, and supply the generated first signal to the second image capturing unit, and a second generation unit configured to generate, based on the signal representing the image output timing of the first image capturing unit, a second signal for controlling a start of measurement of a sensor that measures a position and orientation of the sensor, and supply the generated second signal to the sensor.

14 Claims, 15 Drawing Sheets

FIG. 4
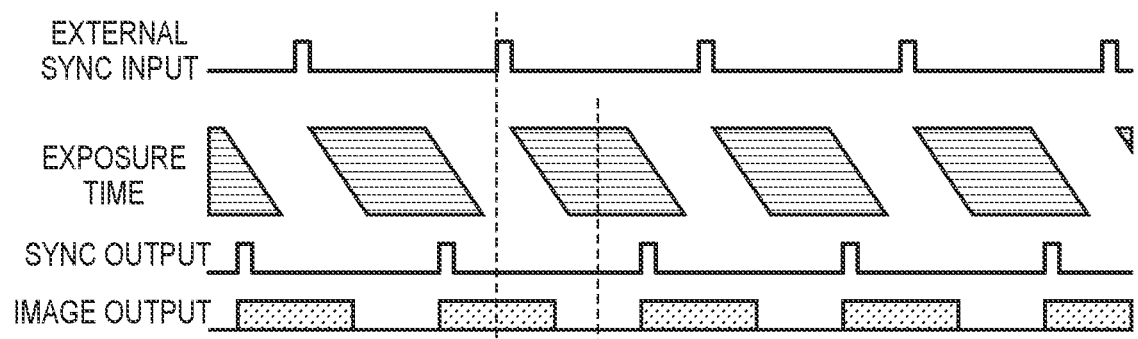
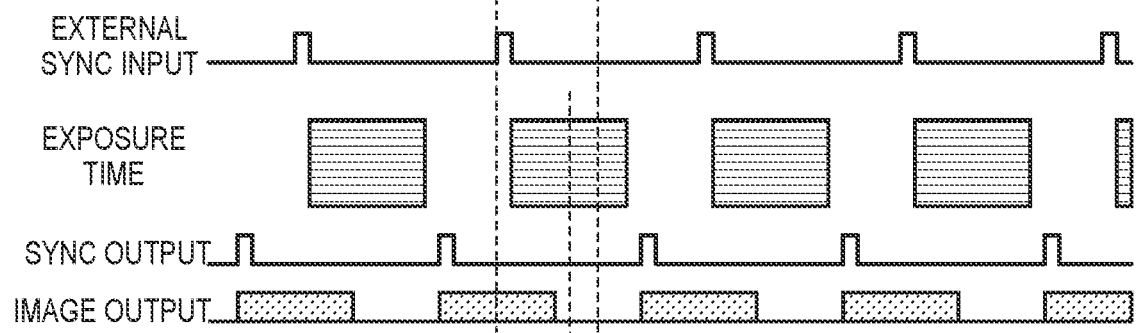
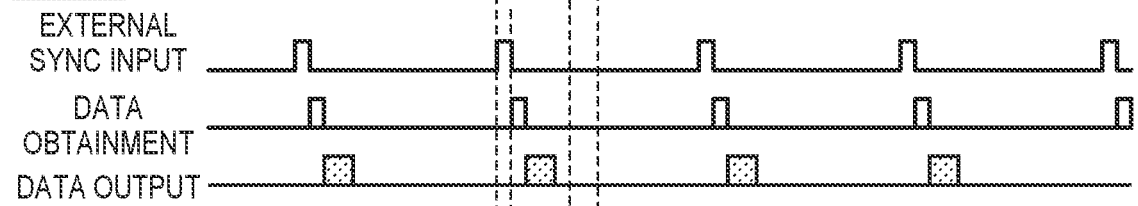

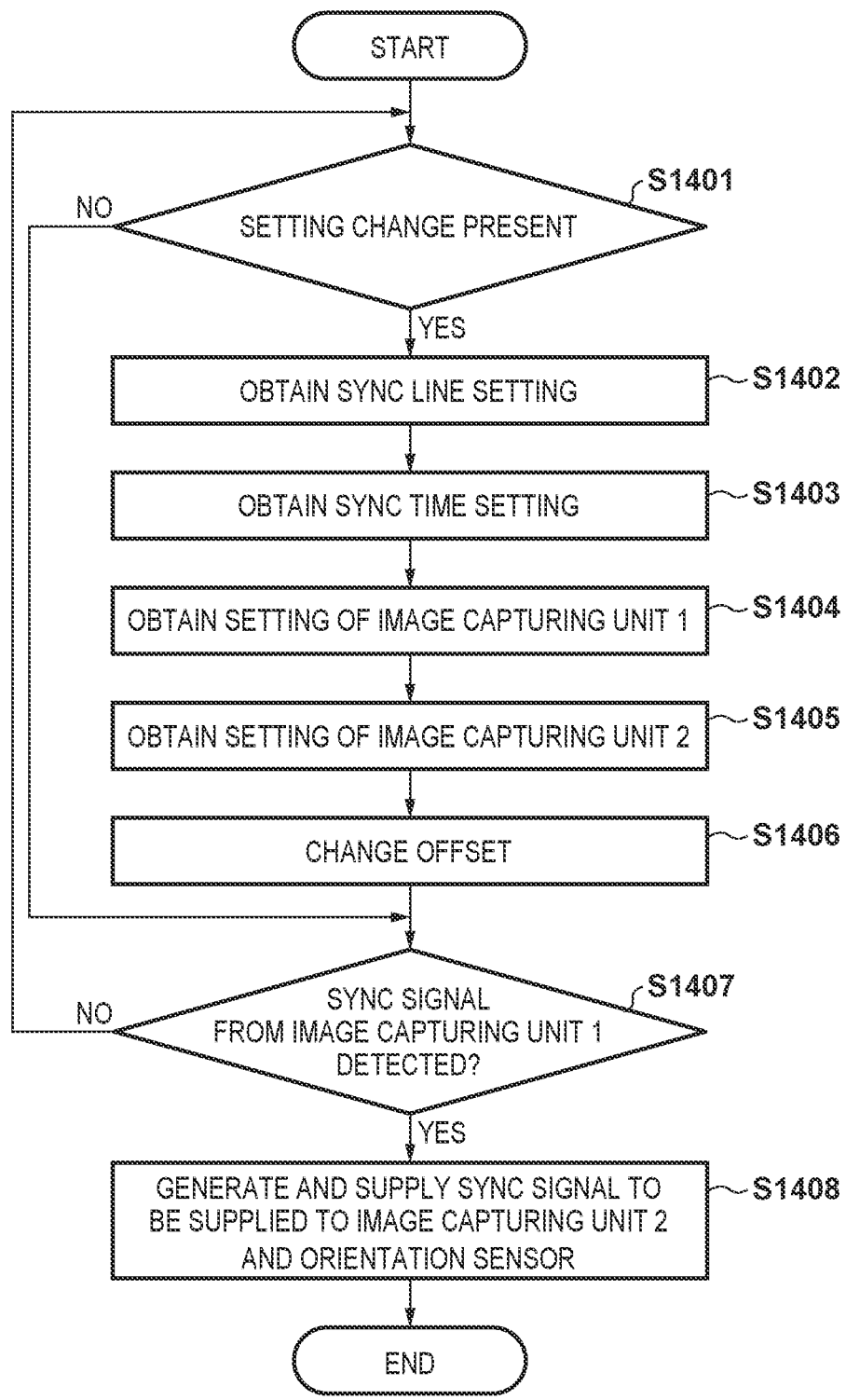

HEAD MOUNTED DISPLAY DEVICE, METHOD OF CONTROLLING HEAD MOUNTED DISPLAY DEVICE, SYSTEM, SYNCHRONOUS CONTROL APPARATUS, AND METHOD OF CONTROLLING SYNCHRONOUS CONTROL APPARATUS

BACKGROUND OF THE INVENTION

Field of the Invention

The present invention relates to a mixed reality presentation technique.

Description of the Related Art

These days, an MR (mixed Reality) technique is known as a technique of seamlessly blending physical and virtual worlds in real time. One of MR techniques is an MR system using a video see-through HMD (Head Mounted Display: to be referred to as an "HMD" if necessary). In the MR system, an HMD-incorporated image capturing unit captures an image of an object almost coincident with an object observed from the pupil position of an HMD wearer. Then, CG (Computer Graphics) is superimposed and displayed on the captured image, and the resultant image is presented to the HMD wearer. The HMD wearer can experience the MR space.

The MR system obtains the position and orientation of the HMD by performing arithmetic processing using captured images and various kinds of sensor information. Image capturing units and various sensors desirably operate as synchronously as possible. For example, Japanese Patent Laid-Open No. 2000-341719 discloses a technique of establishing synchronization by supplying a common driving signal and sync signal to a plurality of image capturing units. Japanese Patent Laid-Open No. 2006-005608 discloses a technique of establishing synchronization by making the barycenters of exposure times coincide with each other for a plurality of image capturing units having different exposure times.

However, the conventional techniques have the following problems. In an arrangement typified by Japanese Patent Laid-Open Nos. 2000-341719 and 2006-005608, only image capturing units are synchronized. In a system using various sensors in addition to image capturing units, like the MR system, if the image capturing units and the sensors operate asynchronously, no satisfactory arithmetic accuracy may be obtained. In this case, misalignment may occur between a captured image and CG.

SUMMARY OF THE INVENTION

The present invention provides a technique for synchronously operating an image capturing unit and an orientation sensor.

According to the first aspect of the present invention, there is provided a head mounted display device including a first image capturing unit and a second image capturing unit different from the first image capturing unit, comprising: a first generation unit configured to generate, based on a signal representing an image output timing of the first image capturing unit, a first signal for controlling a start of exposure of the second image capturing unit, and supply the generated first signal to the second image capturing unit: and a second generation unit configured to generate, based on the signal representing the image output timing of the first image capturing unit, a second signal for controlling a start of measurement of a sensor that measures a position and orientation of the sensor, and supply the generated second signal to the sensor.

According to the second aspect of the present invention, there is provided a method of controlling a head mounted display device including a first image capturing unit and a second image capturing unit different from the first image capturing unit, the method comprising: generating, based on a signal representing an image output timing of the first image capturing unit, a first signal for controlling a start of exposure of the second image capturing unit, and supplying the generated first signal to the second image capturing unit: and generating, based on the signal representing the image output timing of the first image capturing unit, a second signal for controlling a start of measurement of a sensor that measures a position and orientation of the head mounted display device, and supplying the generated second signal to the sensor.

According to the third aspect of the present invention, there is provided a system comprising a head mounted display device including a first image capturing unit and a second image capturing unit different from the first image capturing unit, and an image processing apparatus, the head mounted display device including: a first generation unit configured to generate, based on a signal representing an image output timing of the first image capturing unit, a first signal for controlling a start of exposure of the second image capturing unit, and supply the generated first signal to the second image capturing unit; and a second generation unit configured to generate, based on the signal representing the image output timing of the first image capturing unit, a second signal for controlling a start of measurement of a sensor that measures a position and orientation of the sensor, and supply the generated second signal to the sensor, and the image processing apparatus including: an obtaining unit configured to obtain, from the head mounted display device, an image captured by the first image capturing unit, an image captured by the second image capturing unit in response to reception of the first signal, and a position and orientation measured by the sensor in response to reception of the second signal; a unit configured to generate an image of a virtual space based on the image captured by the second image capturing unit and the position and orientation measured by the sensor, and generate a composite image of the generated image of the virtual space and the image captured by the first image capturing unit; and a unit configured to output the composite image to the head mounted display device.

According to the fourth aspect of the present invention, there is provided a synchronous control apparatus comprising: an image capturing unit: a sensor configured to measure a position and orientation of the sensor; an obtaining unit configured to obtain a signal out of an external sync input signal externally input to control the image capturing unit, and a sync output signal output from the image capturing unit: and a control unit configured to control to execute measurement processing of the sensor at an arbitrary timing in an exposure time in the image capturing unit based on the signal obtained by the obtaining unit.

According to the fifth aspect of the present invention, there is provided a method of controlling a synchronous control apparatus including: an image capturing unit: and a sensor configured to measure a position and orientation of the sensor, the method comprising: obtaining a signal out of an external sync input signal externally input to control the image capturing unit, and a sync output signal output from the image capturing unit; and controlling to execute measurement processing of the sensor at an arbitrary timing in an exposure time in the image capturing unit based on the obtained signal.

Further features of the present invention will become apparent from the following description of exemplary embodiments (with reference to the attached drawings).

BRIEF DESCRIPTION OF THE DRAWINGS

FIG. 4 is a timing chart for explaining the synchronization between the image capturing unit and the orientation sensor by an external sync input;

FIG. 14 is a flowchart of control of the synchronous operation of the image capturing unit 501, the image capturing unit 502, and the orientation sensor 503 by the HMD 101;

DESCRIPTION OF THE EMBODIMENTS

Figure 1:
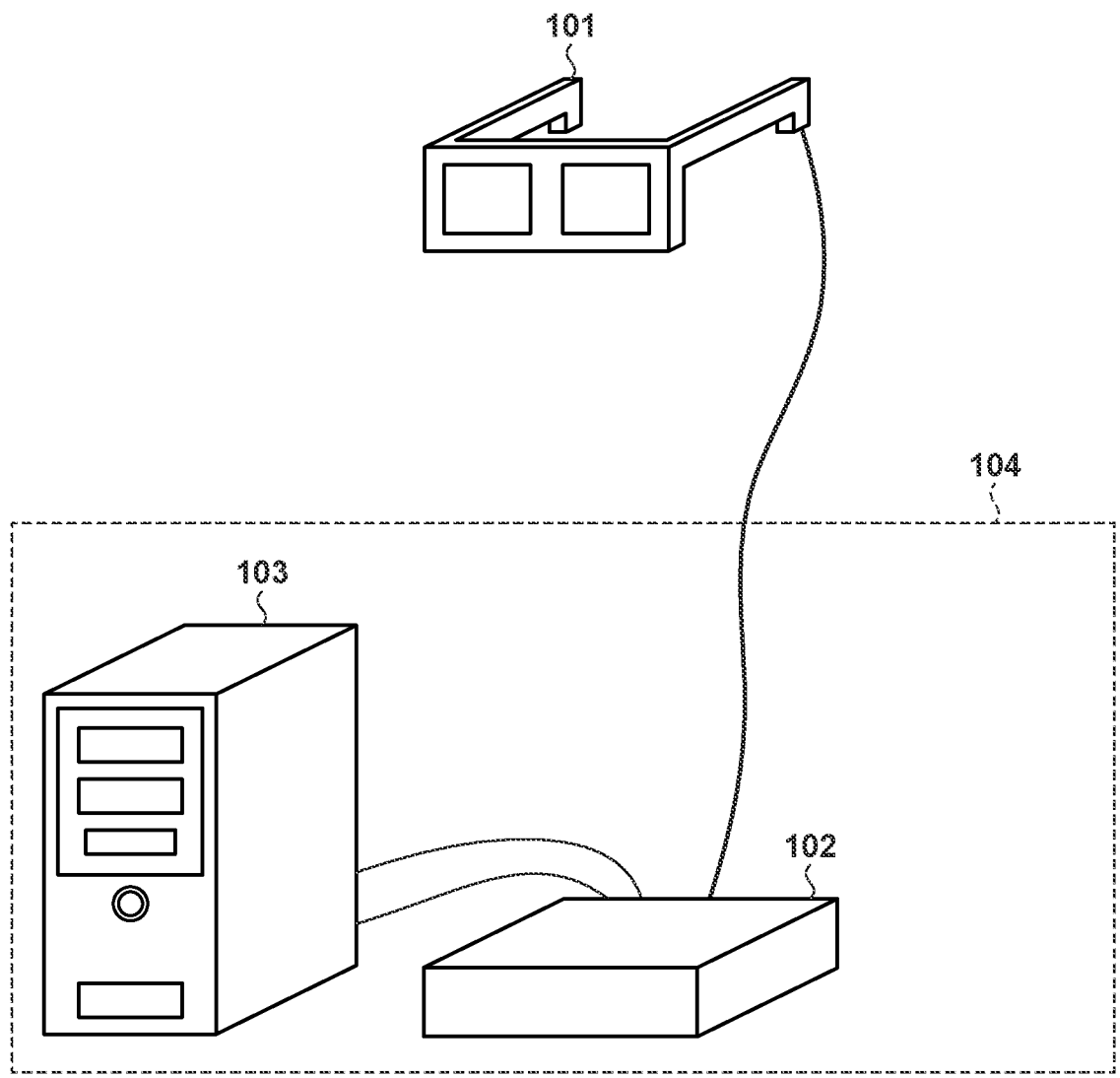
FIG. 1 is a view exemplifying the arrangement of an MR system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

First, the arrangement of an MR system according to the first embodiment will be exemplified with reference to FIG. 1. As shown in FIG. 1, the MR system according to the embodiment includes an HMD 101 serving as an example of a head mounted display device, a computer apparatus 103 that generates an image of a mixed reality space (space obtained by blending physical and virtual spaces) to be displayed on the HMD 101, and a controller 102 that mediates between the HMD 101 and the computer apparatus 103.

First, the HMD 101 will be described. The HMD 101 includes an image capturing unit that captures an image of a physical space, a sensor that measures (measurement processing) the position and orientation of the HMD 101, and a display unit that displays an image of a mixed reality space transmitted from an image processing apparatus 104. The HMD 101 also functions as a synchronous control apparatus for these devices. The HMD 101 transmits to the controller 102 an image captured by the image capturing unit and the position and orientation of the HMD 101 measured by the sensor. The HMD 101 receives from the controller 102 an image of the mixed reality space generated by the computer apparatus 103 based on the captured image and the position and orientation, and displays the received image on the display unit. The image of the mixed reality space is presented in front of the eyes of a user wearing the HMD 101 on his/her head.

The HMD 101 may operate by power supplied from the controller 102 or by power supplied from the battery of the HMD 101. That is, a method of supplying power to the HMD 101 is not limited to a specific one.

In FIG. 1, the HMD 101 and the controller 102 are connected by wire. However, the connection form between the HMD 101 and the controller 102 is not limited to wire, and may be wireless or a combination of wireless and wire. That is, the connection form between the HMD 101 and the controller 102 is not limited to a specific one.

Next, the controller 102 will be described. The controller 102 performs various image processes (for example, resolution conversion, color space conversion, distortion correction of the optical system of the image capturing unit of the HMD 101, and encoding) on a captured image transmitted from the HMD 101. Then, the controller 102 transmits to the computer apparatus 103 the captured image having undergone the image processes and a position and orientation transmitted from the HMD 101. The controller 102 performs similar image processes on an image of the mixed reality space transmitted from the computer apparatus 103, and transmits the processed image to the HMD 101.

Next, the computer apparatus 103 will be described. The computer apparatus 103 obtains the position and orientation (position and orientation of the image capturing unit of the HMD 101) of the HMD 101 based on a captured image and a position and orientation received from the controller 102, and generates an image of a virtual space viewed from a viewpoint having the obtained position and orientation. The computer apparatus 103 generates a composite image (image of the mixed reality space) of the image of the virtual space and the captured image transmitted from the HMD 101 via the controller 102, and transmits the generated composite image to the controller 102.

Figure 2:
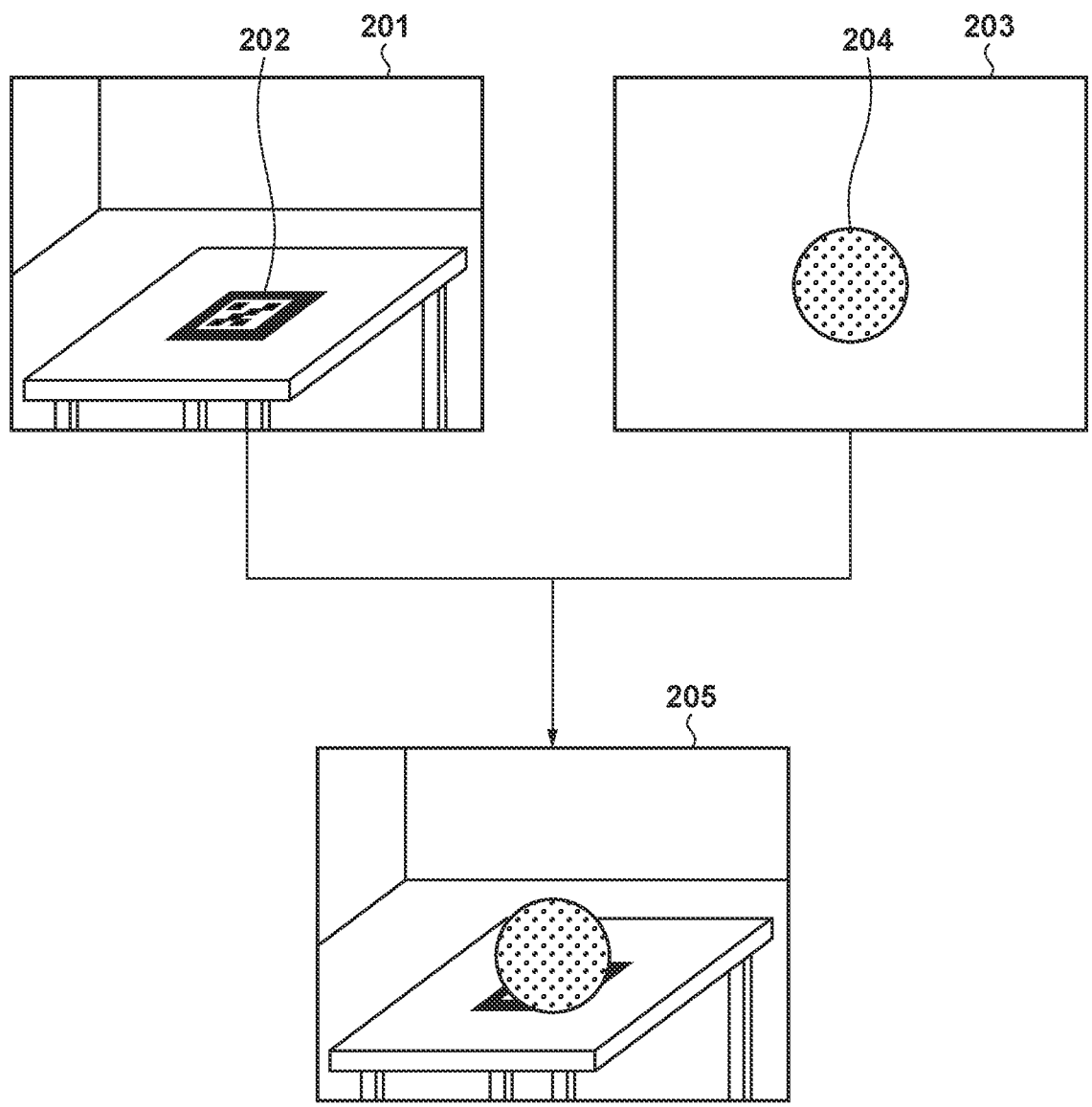
FIG. 2 is a view for explaining processing of generating a composite image from a captured image and an image of a virtual space.

Processing of generating a composite image from a captured image and an image of the virtual space will be explained with reference to FIG. 2. A captured image 201 includes a marker 202 (the number of markers is one in FIG. 2 for descriptive convenience, but a plurality of markers are included in practice) artificially arranged in the physical space. The computer apparatus 103 extracts the marker 202 from the captured image 201, and obtains the position and orientation of the HMD 101 based on the extracted marker 202 and a position and orientation received from the controller 102. The computer apparatus 103 then generates an image 203 of the virtual space viewed from a viewpoint having the obtained position and orientation. The image 203 includes a virtual object 204.

The computer apparatus 103 generates an image 205 of the mixed reality space as a composite image of the captured image 201 and the image 203 of the virtual space. The computer apparatus 103 transmits the generated image 205 to the HMD 101. Note that the captured image and the image of the virtual space are composited using information about the depth in the 3D space and information about the transparency of a virtual object. This enables generating a composite image considering the positional relationship in depth between a physical object and the virtual object, or a composite image in which the virtual object is composited in a semitransparent state.

The computer apparatus 103 and the controller 102 are separate apparatuses in FIG. 1, but may be integrated. In the embodiment, a form will be explained in which the computer apparatus 103 and the controller 102 are integrated. An apparatus constituted by integrating the computer apparatus 103 and the controller 102 will be referred to as the image processing apparatus 104.

Figure 3:
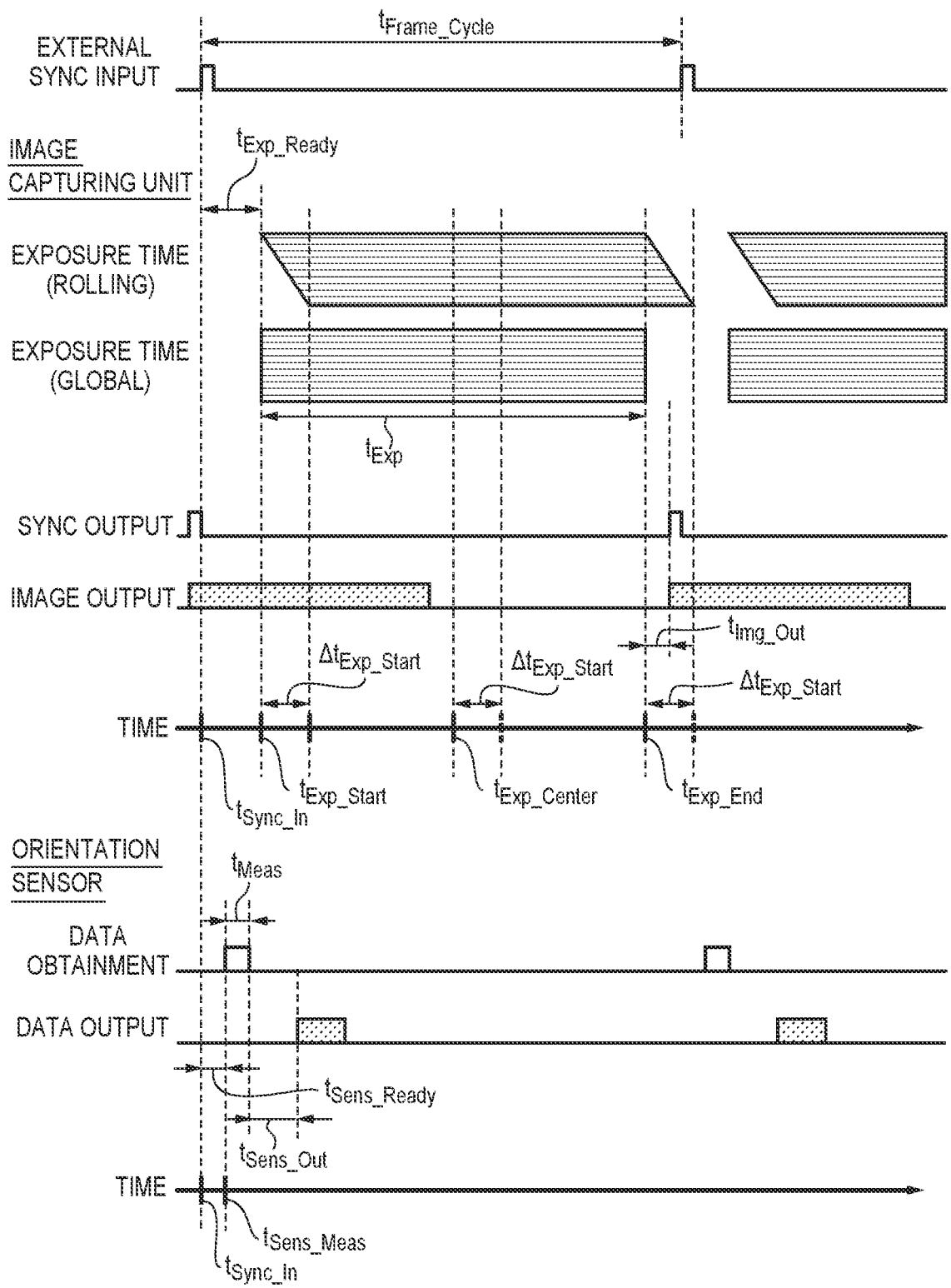
FIG. 3 is a timing chart for explaining the operation timings of an image capturing unit and orientation sensor.

The image capturing unit of the HMD can selectively use a rolling shutter image sensor and a global shutter image sensor in consideration of various factors such as the number of pixels, image quality, noise, sensor size, power consumption, and cost, or can use them in combination depending on the intended use. For example, the rolling shutter image sensor capable of obtaining a higher-quality image is used to capture an image that is composited with an image of the virtual space, and the global shutter image sensor free from image flow is used to capture an image of a marker. The image flow is a phenomenon arising from a rolling shutter operation principle that starts exposure processing sequentially for respective lines in the scanning direction. More specifically, the image flow is known as a phenomenon in which a time lag is generated between the timings of exposure of respective lines, as shown in FIG. 3, and when an image capturing unit or an object moves during the exposure time, the object is deformed and recorded as if it flowed. In FIG. 3, the abscissa represents the time, and "exposure time (rolling)" represents the exposure time of each line subjected to image capturing by the rolling shutter image sensor. "Exposure time (global)" represents the exposure time of each line subjected to image capturing by the global shutter image sensor. In the global shutter type, exposure processing is performed simultaneously on all lines, so no time lag is generated between the exposure timings of respective lines and no image flow occurs.

As shown in FIG. 3, when the image capturing unit receives an external sync input (external sync input signal), exposure of each pixel starts after a processing time $t_{Exp\_Ready}$ till the start of exposure, and exposure of each pixel is performed during an exposure time $t_{Exp}$ set in the image capturing unit. Output of a sync signal (sync output, sync output signal) and an image signal (image output) from the image capturing unit starts $t_{Img\_Out}$ after the end of exposure of each line. As shown in FIG. 3, in the global shutter image capturing unit, the time till an exposure start time $t_{Exp\_Start}$ after a time $t_{Sync\_In}$ at which an external sync input is input, an exposure center time $t_{Exp\_Center}$, and an exposure end time $t_{Exp\_End}$ are uniquely determined as values unique to each image sensor. To the contrary, in the rolling shutter image capturing unit, the exposure start time, the exposure center time, and the exposure end time can take different values within a range equivalent to an exposure start timing difference $\Delta t_{Exp\_Start}$ between start and final lines depending on a line whose exposure time is set as a reference.

As for a sensor (orientation sensor) that measures the position and orientation of the HMD, when an external sync input is received, measurement (data obtainment) of the position and orientation starts after a processing time $t_{Sens\_Ready}$ till the start of measurement, and output (data output) of the position and orientation starts a time $t_{Sense\_Out}$ after the end of measurement.

FIG. 4 is a timing chart for explaining synchronization between the image capturing unit and the orientation sensor based on an external sync input. In FIG. 4, devices are synchronized by supplying a common external sync input at the time $t_{Sync\_In}$ to a rolling shutter image capturing unit 1, a global shutter image capturing unit 2, and the orientation sensor. As described with reference to FIG. 3, the image capturing unit 1, the image capturing unit 2, and the orientation sensor have unique processing times, so lags are generated in the time when the image capturing unit actually performs exposure, and the time when the orientation sensor performs measurement in response to an external sync input. For example, when the exposure center time of the image capturing unit 1 or 2 is regarded as a reference, the position and orientation measurement time of the orientation sensor is $t_{Sens\_Meas}$, the exposure center time of the image capturing unit 1 is $t_{Exp\_Center\_CAM1}$, and the exposure center time of the image capturing unit 2 is $t_{Exp\_Center\_CAM2}$. These times do not coincide with each other.

An arrangement will be considered in which the image capturing unit 1 is used to obtain a captured image that is composited with an image of the virtual space, and the image capturing unit 2 is used to capture an image of a marker. An image of the virtual space is generated based on a captured image of the marker obtained by the image capturing unit 2 and a position and orientation obtained by the orientation sensor, and is influenced by an error arising from the lag between the obtaining timings of the captured image and the position and orientation. Further, the obtaining timing of a captured image obtained by the image capturing unit 1 differs from the obtaining timing of the captured image by the image capturing unit 2 and the obtaining timing of the position and orientation by the orientation sensor. The influence on the positional accuracy of the image of the virtual space superimposed on the captured image becomes larger. To prevent this, it can be said that it is desirable that the MR system performs a synchronous operation on the image capturing unit 1, the image capturing unit 2, and the orientation sensor so that the exposure timing of the image capturing unit 1, the exposure timing of the image capturing unit 2, and the position and orientation obtaining timing of the orientation sensor coincide with each other at higher precision.

Figure 5:
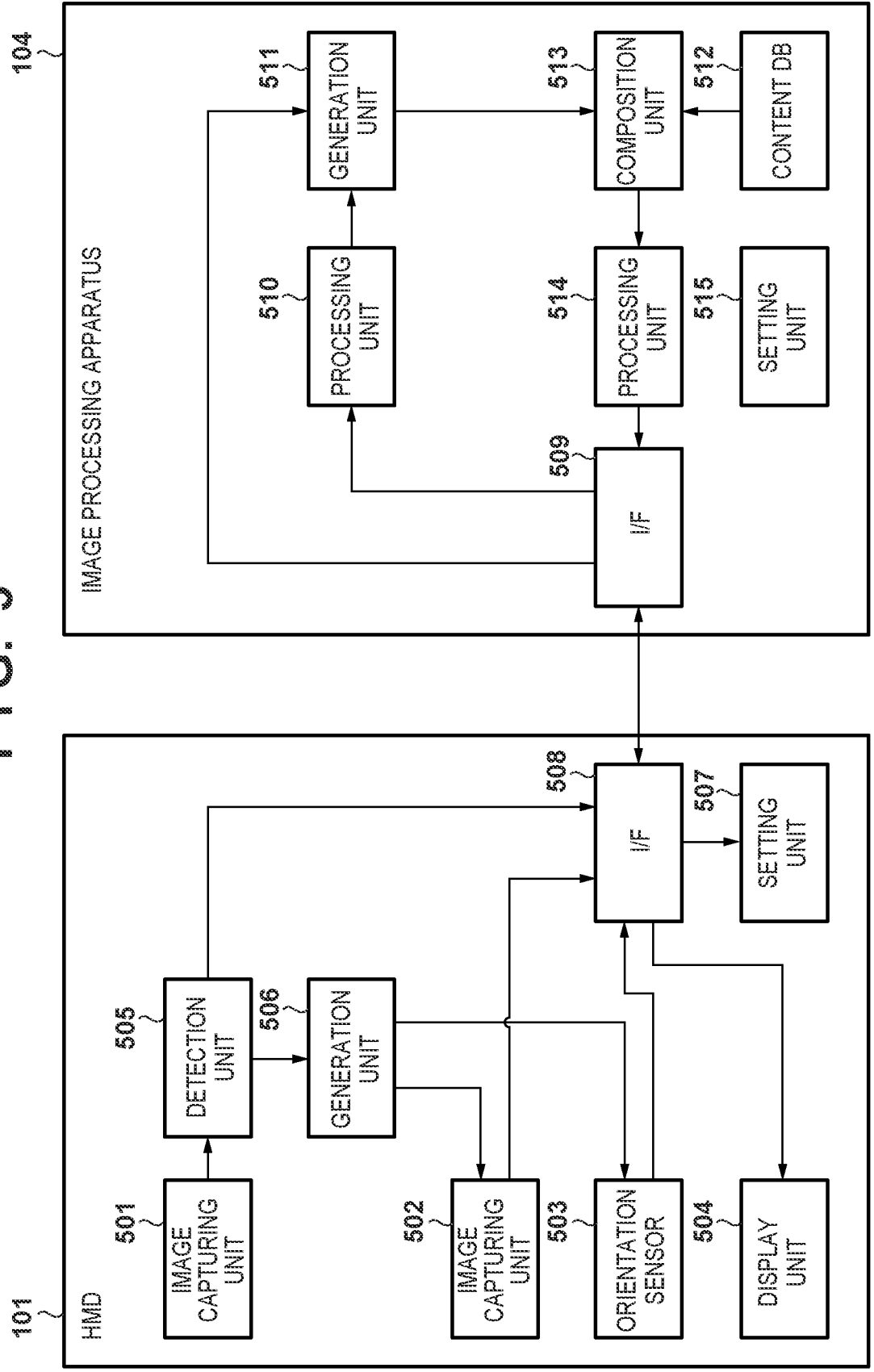
FIG. 5 is a block diagram exemplifying the functional arrangements of an HMD 101 and an image processing apparatus 104.

Next, the functional arrangements of the HMD 101 and the image processing apparatus 104 will be exemplified with reference to the block diagram of FIG. 5. First, the HMD 101 will be explained. An image capturing unit 501 captures an image of the physical space that is composited with an image of the virtual space. The image capturing unit 501 includes a left-eye image capturing portion and a right-eye image capturing portion. The left-eye image capturing portion captures a moving image of the physical space corresponding to the left eye of the wearer of the HMD 101, and outputs an image (captured image) of each frame in the moving image. The right-eye image capturing portion captures a moving image of the physical space corresponding to the right eye of the wearer of the HMD 101, and outputs an image (captured image) of each frame in the moving image. That is, the image capturing unit 501 obtains captured images as stereo images having a parallax that almost coincide with the positions of the left and right eyes of the wearer of the HMD 101. Note that in the HMD of the MR system, the central optical axis of the image capturing range of the image capturing unit is desirably arranged to almost coincide with the line-of-sight direction of the wearer of the HMD.

Each of the left- and right-eye image capturing portions includes an optical system and an image capturing device. Light incoming from the outside enters the image capturing device via the optical system, and the image capturing device outputs an image corresponding to the entering light as a captured image. As the image capturing device of the image capturing unit 501, a rolling shutter image sensor is used. The image capturing unit 501 periodically outputs a captured image and also outputs a sync signal representing the output start timing (image output timing) of the captured image.

An image capturing unit 502 includes a plurality of image capturing portions for capturing a marker arranged in the physical space, and obtains captured images as stereo images having a parallax. Each image capturing portion captures a moving image of the physical space and outputs an image (captured image) of each frame in the moving image. Each image capturing portion of the image capturing unit 502 includes an optical system and an image capturing device. Light incoming from the outside enters the image capturing device via the optical system, and the image capturing device outputs an image corresponding to the entering light as a captured image. As the image capturing device of the image capturing unit 502, a global shutter image sensor is used. A plurality of image capturing portions of the image capturing unit 502 start exposure every time they receive a sync signal from a generation unit 506, and end the exposure after the lapse of an exposure time of one frame.

An orientation sensor 503 measures the position and orientation of the HMD 101 every time it receives a sync signal from the generation unit 506, and outputs the measured position and orientation. The orientation sensor 503 is implemented by a magnetic sensor, an ultrasonic sensor, an acceleration sensor, an angular velocity sensor, or the like.

A display unit 504 includes a right-eye display portion and a left-eye display portion. The left-eye display portion displays a left-eye image of the mixed reality space received from the image processing apparatus 104 via an/F 508. The right-eye display portion displays a right-eye image of the mixed reality space received from the image processing apparatus 104 via the I/F 508. Each of the left- and right-eye display portions includes a display optical system and a display element. The display optical system may be not only an eccentric optical system such as a free-form surface prism, but also a normal co-axial optical system or an optical system having a zoom mechanism. The display element is, for example, a compact liquid crystal display, an organic EL display, or a MEMS retina scanning device. Light traveling from an image displayed on the display element enters the eyes of the wearer of the HMD 101 via the display optical system.

A detection unit 505 detects a sync signal (signal representing the start timing of image output from the image capturing unit 501) output from the image capturing unit 501, and upon detecting the sync signal, notifies the generation unit 506 of the detection.

When the generation unit 506 receives the notification from the detection unit 505, it generates sync signals to be supplied to the image capturing unit 502 and the orientation sensor 503 based on the sync signal detected by the detection unit 505, and supplies the generated sync signals to the image capturing unit 502 and the orientation sensor 503. A setting unit 507 sets various parameters used in the operation of the HMD 101.

All of a captured image output from the image capturing unit 501, a captured image output from the image capturing unit 502, and a position and orientation output from the orientation sensor 503 are transmitted to the image processing apparatus 104 via the I/F 508.

Next, the image processing apparatus 104 will be described. The image processing apparatus 104 receives via an I/F 509 the captured images and the position and orientation transmitted from the HMD 101. A processing unit 510 performs various image processes on the captured images received from the HMD 101 via the I/F 509.

A generation unit 511 extracts (recognizes) markers from the left- and right-eye captured images having undergone the image processes by the processing unit 510. The generation unit 511 obtains the positions and orientations of the left- and right-eye image capturing portions based on the markers and the position and orientation received from the HMD 101 via the I/F 509. Processing for obtaining the position and orientation of an image capturing portion based on a marker in an image, and a position and orientation measured by a sensor included in an HMD together with the image capturing unit is generally known, so a description of this technique will be omitted.

Various data (virtual space data) necessary to render an image of the virtual space is saved in a content DB (DataBase) 512. The virtual space data includes, for example, data defining each virtual object constituting the virtual space (for example, data defining the geometric shape, color, texture, arrangement position and orientation, and the like of the virtual object). Also, the virtual space data includes, for example, data defining a light source arranged in the virtual space (for example, data defining the type, position and orientation, and the like of the light source).

A composition unit 513 builds a virtual space using the virtual space data saved in the content DB 512. The composition unit 513 generates an image L of the virtual space viewed from a viewpoint having the position and orientation of the left-eye image capturing portion obtained by the generation unit 511. The composition unit 513 generates an image R of the virtual space viewed from a viewpoint having the position and orientation of the right-eye image capturing portion obtained by the generation unit 511. The composition unit 513 generates a composite image L as a left-eye image L of the mixed reality space by compositing the image L of the virtual space and an image captured by the left-eye image capturing portion. The composition unit 513 generates a composite image R as a right-eye image R of the mixed reality space by compositing the image R of the virtual space and an image captured by the right-eye image capturing portion.

A processing unit 514 performs various image processes on the image L of the mixed reality space and the image R of the mixed reality space generated by the composition unit 513. The processing unit 514 transmits, to the HMD 101 via the I/F 509, the image L of the mixed reality space and the image R of the mixed reality space having undergone the image processes. A setting unit 515 sets various parameters used in the operation of the image processing apparatus 104.

Figure 6:
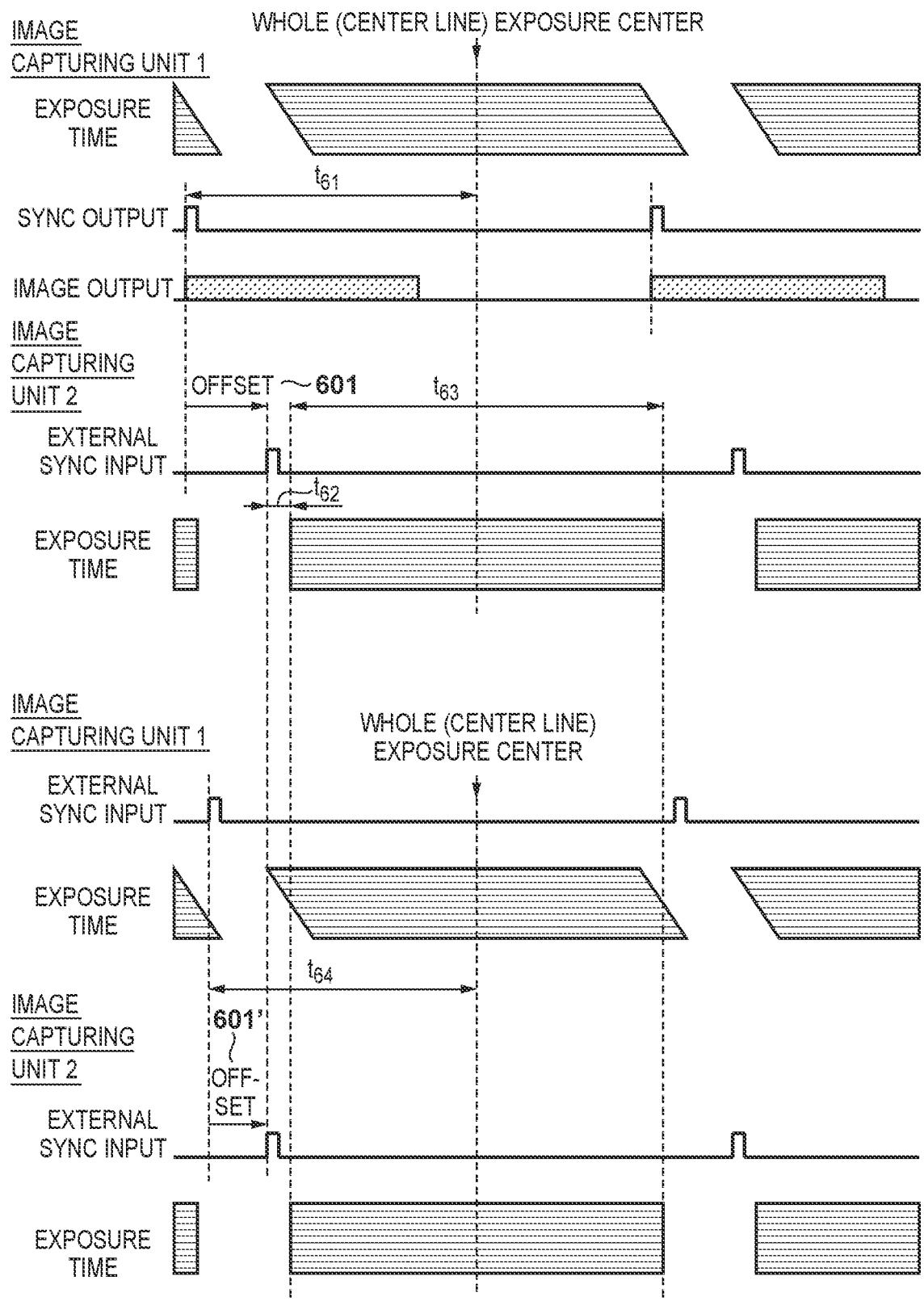
FIG. 6 is a timing chart showing an example of generating by a generation unit 506 a sync signal to be supplied to an image capturing unit 502, and generation of an external sync input to an image capturing unit 2 when an external sync input to an image capturing unit 1 is set as a reference.

Next, an example of generating by the generation unit 506 a sync signal to be supplied to the image capturing unit 502 will be explained with reference to a timing chart on the upper part of FIG. 6. In the following description, an "image capturing unit 1" corresponds to the image capturing unit 501, and an "image capturing unit 2" corresponds to the image capturing unit 502. In FIG. 6, the abscissa represents the time.

When the detection unit 505 detects a sync signal (sync output) from the image capturing unit 1, it notifies the generation unit 506 of the detection. Upon receiving the notification, the generation unit 506 generates a "sync signal (external sync input) for controlling the start of exposure of the image capturing unit 2" after an offset 601 from the detection timing of the sync signal. Here, t61 is the time till a "center time (exposure center time) in the exposure time of the next frame at the detection timing in the image capturing unit 1" after the detection timing of the sync signal, t62 is a "processing time till the start of exposure" unique to the image capturing unit 2, and t63 is the exposure time of one frame in the image capturing unit 2. At this time, the offset 601 can be calculated according to the following equation:

$$\text{offset } 601 = t61 - t62 - t63/2$$

Assume that the offset 601 is obtained and set in advance by the setting unit 507. Note that the setting unit 507 may obtain and set the offset 601 periodically or irregularly. The generation unit 506 supplies the generated "sync signal for controlling the start of exposure of the image capturing unit 2" to the image capturing unit 2.

Upon receiving the generated "sync signal for controlling the start of exposure of the image capturing unit 2", the image capturing unit 2 starts exposure. Since the center time of the exposure time coincides with the center time in the exposure time of the image capturing unit 1, the image capturing units 1 and 2 perform exposure synchronously as a result. That is, the generation unit 506 generates a sync signal to be supplied to the image capturing unit 2 so that the center time of the exposure time of the image capturing unit 1 coincides with that of the exposure time of the image capturing unit 2.

Even if devices to perform a synchronous operation include a device having no external sync input function, the device is set as the reference of the synchronous operation and the synchronous operation between the devices can be implemented.

A timing chart on the lower part of FIG. 6 shows generation of an external sync input to the image capturing unit 2 when an external sync input to the image capturing unit 1 is set as a reference. When the HMD 101 detects an external sync input to the image capturing unit 1, it generates an external sync input to the image capturing unit 2 after an offset 601'. Letting 64 be the time till a "center time in the exposure time of the next frame at the detection timing in the image capturing unit 1" after the detection timing of the external sync input to the image capturing unit 1, the offset 601' can be calculated according to the following equation:

$$\text{offset } 601' = t64 - t62 - t63/2$$

In the above description, the synchronous timing in the synchronous operation is the center time in the exposure time of the image capturing unit 1.

However, the setting of the synchronous timing in the embodiment is not limited to this and can be an arbitrary timing in the exposure time. A synchronous operation when a sync signal from the image capturing unit 1 in the timing chart shown in the upper part of FIG. 6 is set as a reference will be described. However, the synchronous operation can be implemented similarly even when an external sync input to the image capturing unit 1 in the timing chart shown in the lower part of FIG. 6 is set as a reference.

Figure 7:
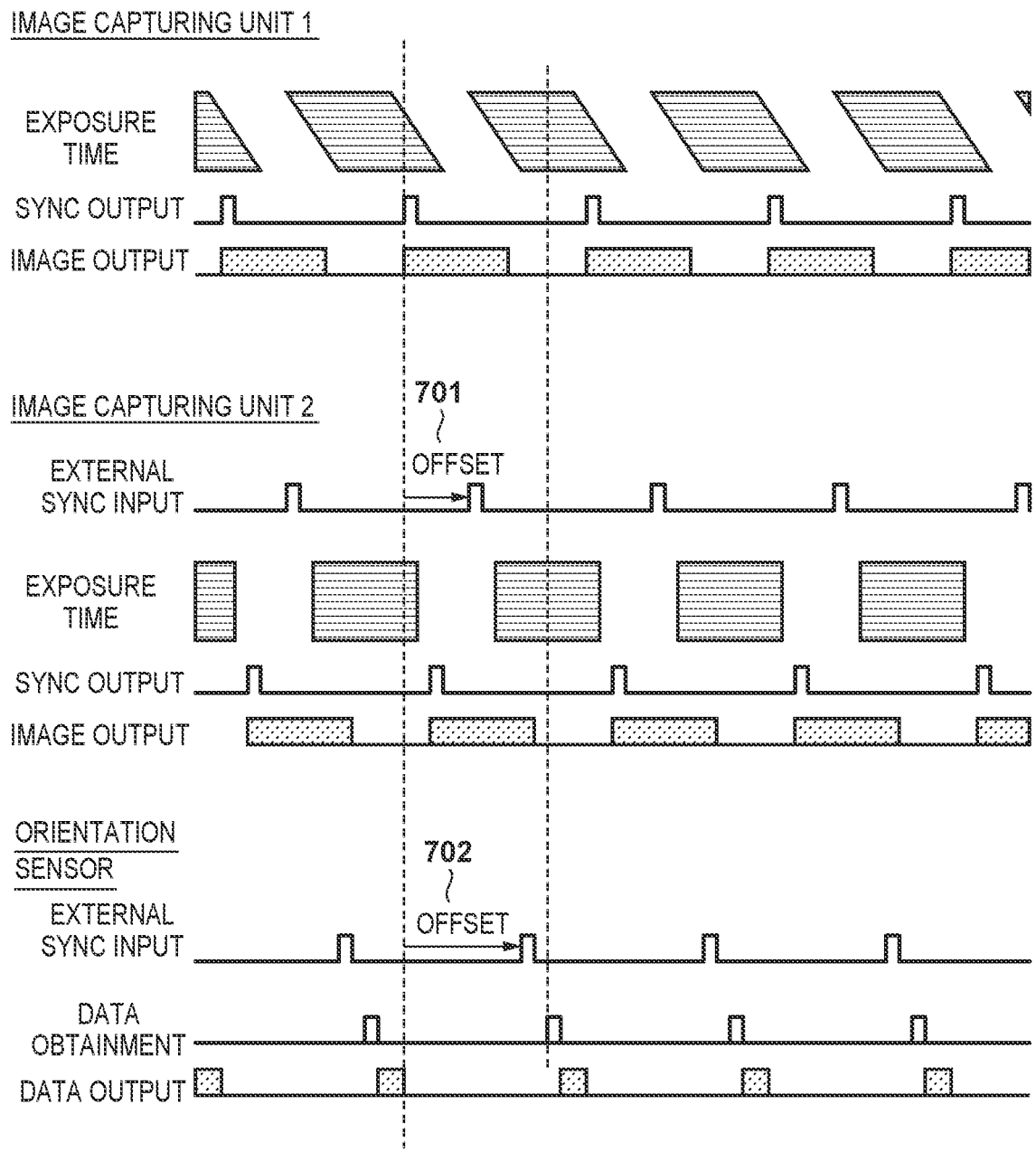
FIG. 7 is a timing chart for explaining the synchronous operation of an image capturing unit 501, the image capturing unit 502, and an orientation sensor 503.

The synchronous operation of the image capturing unit 501, the image capturing unit 502, and the orientation sensor 503 according to the embodiment will be described with reference to FIG. 7. In FIG. 7, the abscissa represents the time.

When the detection unit 505 detects a sync signal (sync output) from the image capturing unit 1, it notifies the generation unit 506 of the detection. Upon receiving the notification, the generation unit 506 generates a "sync signal (external sync input) for controlling the start of exposure of the image capturing unit 2" after an offset 701 from the detection timing of the sync signal. The offset 701 is set by the setting unit 507 similarly to the offset 601. Upon receiving the generated "sync signal for controlling the start of exposure of the image capturing unit 2", the image capturing unit 2 starts exposure and outputs, in accordance with the sync output of the image capturing unit 2, data of each line captured by the exposure.

Upon receiving the notification, the generation unit 506 generates a "sync signal (external sync input) for controlling the start of measurement of a position and orientation by the orientation sensor 503" after an offset 702 from the detection timing of the sync signal. The offset 702 can be calculated using the time t61 and a "processing time $t_{Sens\_Ready}$ till the start of measurement of a position and orientation after the orientation sensor 503 receives an external sync input" according to the following equation:

$$\text{offset } 702 = t61 - t_{Sens\_Ready}$$

Assume that the offset 702 is obtained and set in advance by the setting unit 507. The generation unit 506 supplies the generated "sync signal for controlling the start of measurement of a position and orientation by the orientation sensor 503" to the orientation sensor 503. Upon receiving the generated "sync signal for controlling the start of measurement of a position and orientation by the orientation sensor 503", the orientation sensor 503 starts measurement (data obtainment) of a position and orientation. That is, the generation unit 506 generates a sync signal to be supplied to the image capturing unit 2 and a sync signal to be supplied to the orientation sensor 503 so that the center time of the exposure time of the image capturing unit 1, that of the exposure time of the image capturing unit 2, and the timing (measurement timing) of data obtainment by the orientation sensor 503 coincide with each other.

Figure 8:
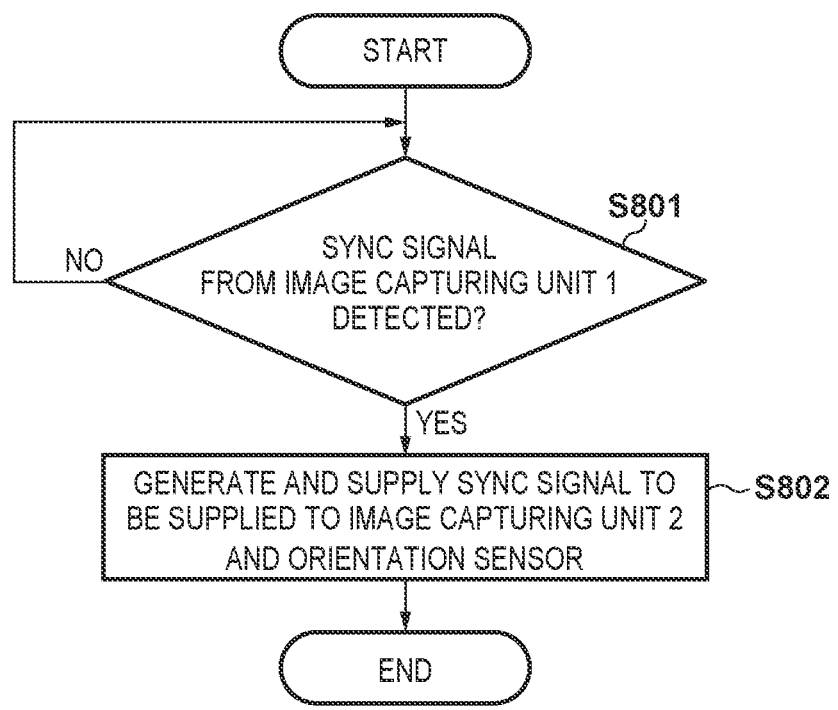
FIG. 8 is a flowchart of control of the synchronous operation of the image capturing unit 501, the image capturing unit 502, and the orientation sensor 503 by the HMD 101.

Control of the synchronous operation of the image capturing unit 501, the image capturing unit 502, and the orientation sensor 503 by the HMD 101 according to the embodiment will be described with reference to the flowchart of FIG. 8. If the detection unit 505 detects a sync signal (sync output) from the image capturing unit 501, it notifies the generation unit 506 of the detection and the process advances to step S802 via step S801. If the detection unit 505 does not detect a sync signal (sync output) from the image capturing unit 501, the process stands by in step S801.

In step S802, upon receiving the notification from the detection unit 505, the generation unit 506 generates a "sync signal to be supplied to the image capturing unit 502" after the offset 701 from the detection timing of the sync signal, and supplies the generated sync signal to the image capturing unit 502. Further, the generation unit 506 generates a "sync signal to be supplied to the orientation sensor 503" after the offset 702 from the detection timing of the sync signal, and supplies the generated sync signal to the orientation sensor 503.

As described above, according to the first embodiment, the synchronous operation of the image capturing unit 501, the image capturing unit 502, and the orientation sensor 503 can be implemented based on the detection timing of a sync signal from the image capturing unit 501 or an external sync input to the image capturing unit 501. Since the processing times and the like of respective devices are considered, the image capturing and data obtaining timings of the respective devices can coincide with an arbitrary timing in the exposure time. A more real MR experience free from misalignment between a captured image and an image of the virtual space can be provided. Even when the image capturing unit 501 does not have the external sync input function, the synchronous operation can be implemented and the choice of devices can be widened.

Second Embodiment

In the following embodiments including the second embodiment, differences from the first embodiment will be explained, and the remaining parts are similar to the first embodiment, unless otherwise specified. In the first embodiment, an arrangement has been described in which sync signals to respective devices are generated in consideration of the processing times and the like of the respective devices with reference to the detection timing of a sync signal from the image capturing unit 501. In the second embodiment, an arrangement will be explained in which the synchronous operation between devices is performed when the setting of the exposure time of an image capturing unit 501 or 502 is changed or the setting of the synchronous timing is changed.

Figure 9:
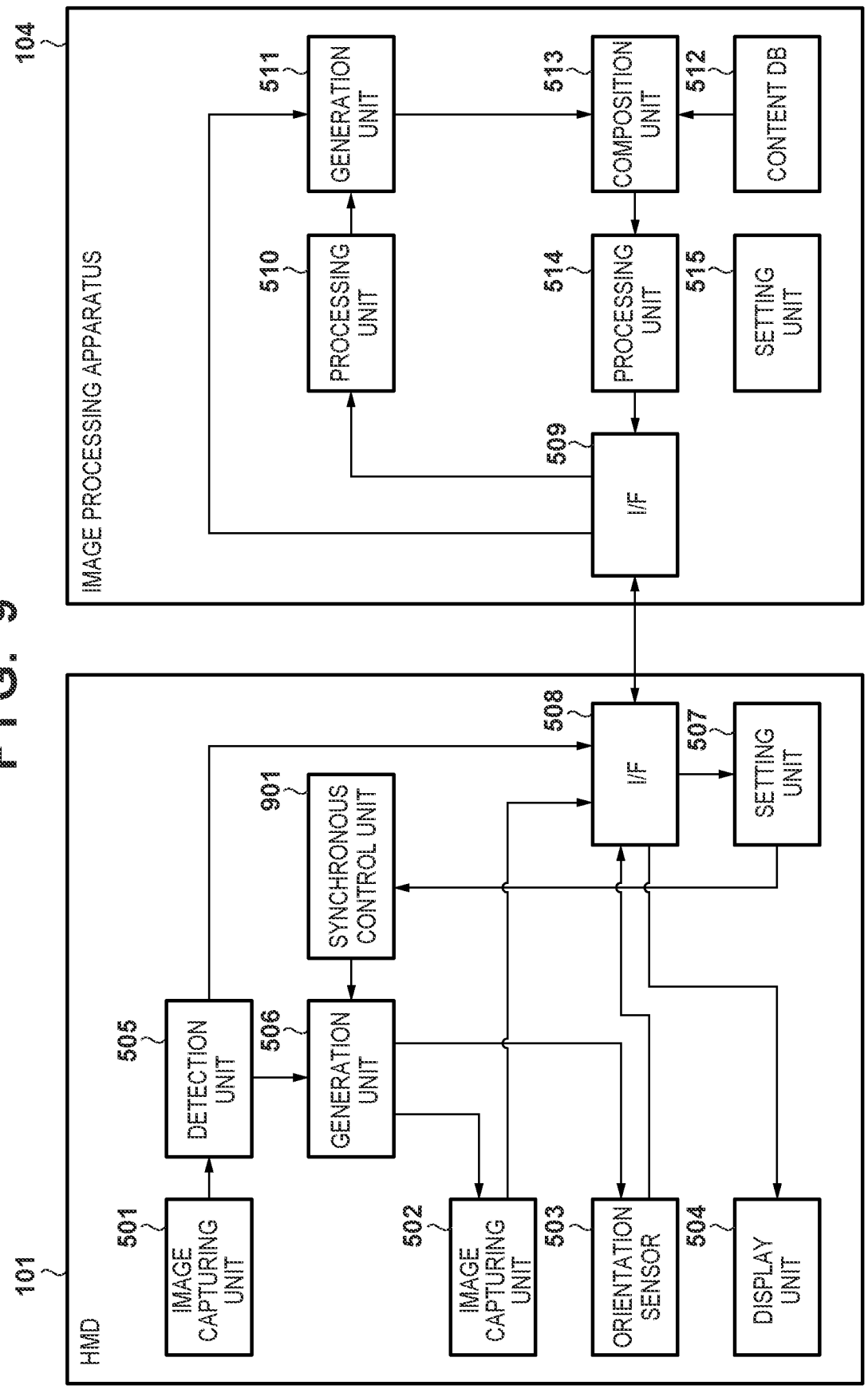
FIG. 9 is a block diagram exemplifying the functional arrangements of the HMD 101 and the image processing apparatus 104.

First, the functional arrangements of an HMD 101 and an image processing apparatus 104 will be exemplified with reference to the block diagram of FIG. 9. A generation unit 506 generates a sync signal to be supplied to the image capturing unit 502 and a sync signal to be supplied to an orientation sensor 503 under the control of a synchronous control unit 901.

The synchronous control unit 901 controls generation of a sync signal by the generation unit 506 in accordance with a change of the setting of the exposure time of the image capturing unit 501 or 502 by a setting unit 507. The synchronous control unit 901 controls generation of a sync signal by the generation unit 506 in accordance with a change of the setting of a time (line corresponding to the time) in the exposure time of the image capturing unit 501 with which the generation timing of a sync signal to be supplied to the image capturing unit 502 or the orientation sensor 503 is synchronized.

Figure 10:
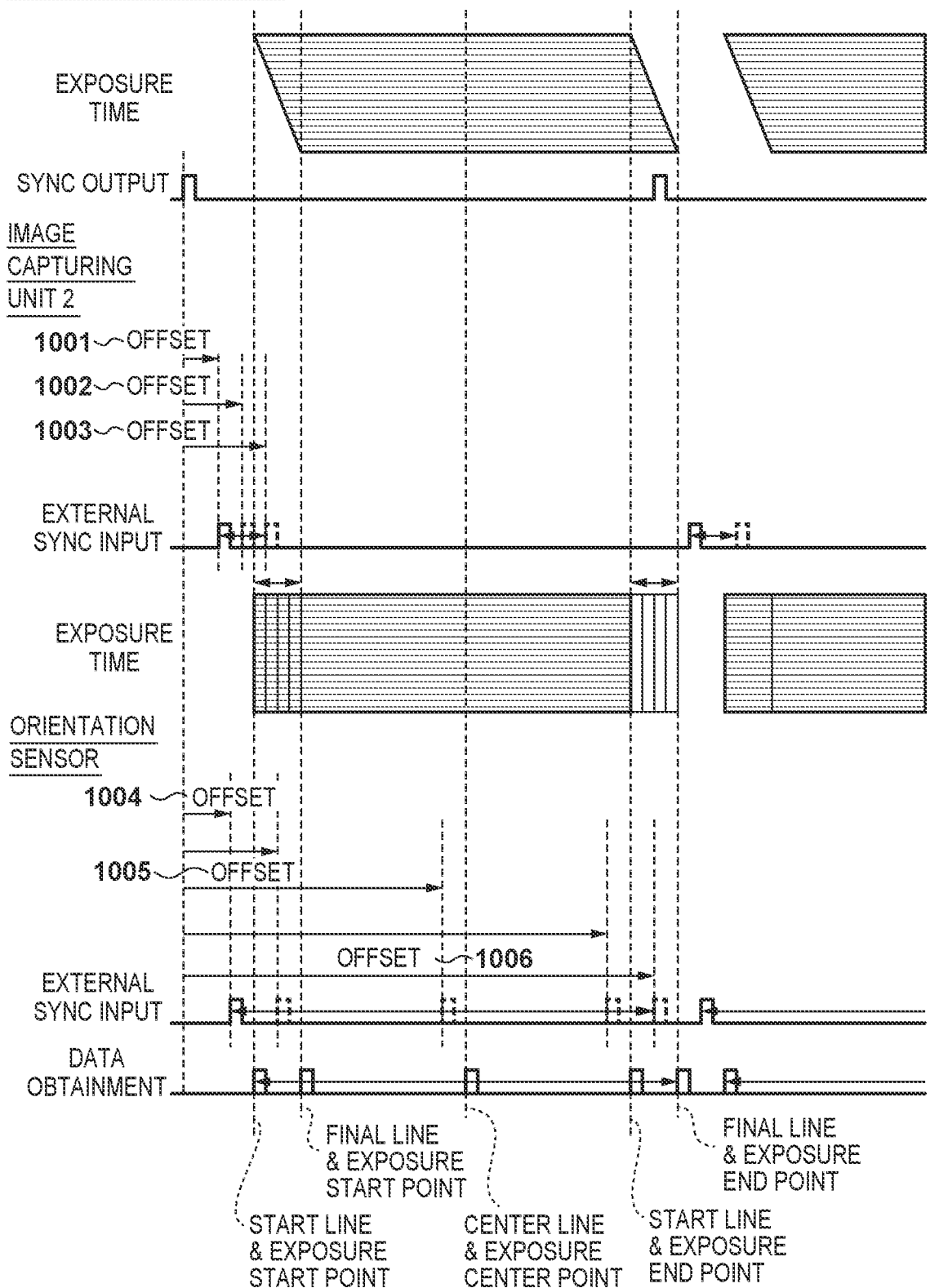
FIG. 10 is a timing chart for explaining generation processing of generating sync signals to be supplied to the image capturing unit 502 and the orientation sensor 503.

Next, generation processing of generating sync signals to be supplied to the image capturing unit 502 and the orientation sensor 503 in consideration of a lag between the exposure times of lines of an image captured by a rolling shutter image sensor will be described with reference to FIG. 10.

When a detection unit 505 detects a sync signal (sync output) from an image capturing unit 1, it notifies the generation unit 506 of the detection. Upon receiving the notification, the generation unit 506 generates a sync signal to be supplied to an image capturing unit 2 and a sync signal to be supplied to the orientation sensor 503 in accordance with the detection timing of the sync signal under the control of the synchronous control unit 901.

Assume that the exposure time of the image capturing unit 1 and that of the image capturing unit 2 are equal, and the setting unit 507 sets the "exposure start time of the start line of an image captured by the image capturing unit 1 as the reference of the synchronous timing". In this case, the generation unit 506 generates a "sync signal (external sync input) for controlling the start of exposure of the image capturing unit 2" after an offset 1001 from the detection timing of the sync signal. The offset 1001 can be obtained as a result of subtracting the time t62 from a time till the "exposure start time of the start line of an image captured by the image capturing unit 1" after the detection timing of the sync signal. Also, the generation unit 506 generates a "sync signal (external sync input) for controlling the start of measurement of a position and orientation by the orientation sensor" after an offset 1004 from the detection timing of the sync signal. The offset 1004 can be obtained as a result of subtracting the processing time tSens_Ready from a time till the "exposure start time of the start line of an image captured by the image capturing unit 1" after the detection timing of the sync signal.

Assume that the exposure time of the image capturing unit 1 and that of the image capturing unit 2 are equal, and the setting unit 507 sets the "exposure center time of the center line of an image captured by the image capturing unit 1 as the reference of the synchronous timing". In this case, the generation unit 506 generates a "sync signal (external sync input) for controlling the start of exposure of the image capturing unit 2" after an offset 1002 from the detection timing of the sync signal. The offset 1002 can be obtained as a result of subtracting the time t62 from a time till the "exposure start time of the center line of an image captured by the image capturing unit 1" after the detection timing of the sync signal. Also, the generation unit 506 generates a "sync signal (external sync input) for controlling the start of measurement of a position and orientation by the orientation sensor" after an offset 1005 from the detection timing of the sync signal. The offset 1005 can be obtained as a result of subtracting the processing time tSens_Ready from a time till the "exposure start time of the center line of an image captured by the image capturing unit 1" after the detection timing of the sync signal.

Assume that the exposure time of the image capturing unit 1 and that of the image capturing unit 2 are equal, and the setting unit 507 sets the "exposure end time of the final line of an image captured by the image capturing unit 1 as the reference of the synchronous timing". In this case, the generation unit 506 generates a "sync signal (external sync input) for controlling the start of exposure of the image capturing unit 2" after an offset 1003 from the detection timing of the sync signal. The offset 1003 can be obtained as a result of subtracting the time t62 from a time till the "exposure start time of the final line of an image captured by the image capturing unit 1" after the detection timing of the sync signal. Also, the generation unit 506 generates a "sync signal (external sync input) for controlling the start of measurement of a position and orientation by the orientation sensor" an offset 1006 after the detection timing of the sync signal. The offset 1006 can be obtained as a result of subtracting the processing time tSens_Ready from a time till the "exposure start time of the final line of an image captured by the image capturing unit 1" after the detection timing of the sync signal.

In this manner, the synchronous control unit 901 supplies offsets corresponding to the reference of the synchronous timing to the generation unit 506 so that sync signals to be supplied to the image capturing unit 2 and the orientation sensor are generated based on the offsets corresponding to the reference of the synchronous timing.

As for arbitrary timings such as the exposure start time of the final line and the exposure end time of the start line, the synchronous operation can be performed by adjusting offsets to the image capturing unit 2 and the orientation sensor based on various setting contents by the setting unit 507.

Next, generation processing of generating sync signals to be supplied to the image capturing unit 2 and the orientation sensor using, as the reference of the synchronous timing, the exposure center time of the center line of an image captured by a rolling shutter image sensor will be described with reference to FIG. 11.

When the detection unit 505 detects that the image capturing unit 1 has output a sync signal corresponding to a captured image (frame (N−1)) of the (N−1)th frame, the generation unit 506 generates a "sync signal (external sync input) for controlling the start of exposure (for image capturing of a frame N) of the image capturing unit 2" after an offset 1101, and supplies it to the image capturing unit 2. The offset 1101 can be obtained by the calculation method described with reference to FIG. 10 (offset calculation method when the "exposure center time of the center line of an image captured by the image capturing unit 1 is set as the reference of the synchronous timing"). When the detection unit 505 detects that the image capturing unit 1 has output a sync signal corresponding to the frame (N−1), the generation unit 506 generates a "sync signal (external sync input) for controlling the start of measurement (for the frame N) of a position and orientation by the orientation sensor" after an offset 1104, and supplies it to the orientation sensor. The offset 1104 can be obtained by the calculation method described with reference to FIG. 10 (offset calculation method when the "exposure center time of the center line of an image captured by the image capturing unit 1 is set as the reference of the synchronous timing").

Assume that the setting unit 507 performs a setting (setting change 2) of changing the exposure time of the image capturing unit 2 until the detection unit 505 detects a sync signal corresponding to the frame N after detecting a sync signal corresponding to the frame (N−1).

At this time, when the detection unit 505 detects that the image capturing unit 1 has output a sync signal corresponding to the frame N, the generation unit 506 generates a "sync signal (external sync input) for controlling the start of exposure (for image capturing of a frame (N+1)) of the image capturing unit 2" after an offset 1102, and supplies it to the image capturing unit 2. The offset 1102 can be obtained by a method similar to that of the offset 1101. Further, when the detection unit 505 detects that the image capturing unit 1 has output a sync signal corresponding to the frame N, the generation unit 506 generates a "sync signal (external sync input) for controlling the start of measurement (for the frame (N+1)) of a position and orientation by the orientation sensor" after an offset 1104, and supplies it to the orientation sensor.

Assume that the setting unit 507 performs a setting (setting change 1) of changing the exposure time of the image capturing unit 1 until the detection unit 505 detects a sync signal corresponding to the frame (N+1) after detecting a sync signal corresponding to the frame N.

At this time, when the detection unit 505 detects that the image capturing unit 1 has output a sync signal corresponding to the frame (N+1), the generation unit 506 generates a "sync signal (external sync input) for controlling the start of exposure (for image capturing of a frame (N+2)) of the image capturing unit 2" after an offset 1103, and supplies it to the image capturing unit 2. The offset 1103 can be obtained by a method similar to that of the offset 1101. Further, when the detection unit 505 detects that the image capturing unit 1 has output a sync signal corresponding to the frame (N+1), the generation unit 506 generates a "sync signal (external sync input) for controlling the start of measurement (for the frame (N+2)) of a position and orientation by the orientation sensor" after an offset 1105, and supplies it to the orientation sensor. The offset 1105 can be obtained by a method similar to that of the offset 1104.

After that, no setting change by the setting unit 507 is performed, and no offset switching occurs. In this way, the synchronous control unit 901 obtains offsets and supplies them to the generation unit 506 so that sync signals to be supplied to the image capturing unit 2 and the orientation sensor are generated based on the offsets corresponding to a setting change of the exposure time of the image capturing unit by the setting unit 507.

The above-described processing can be performed to implement a synchronous operation in which the exposure center time of the image capturing unit 1, that of the image capturing unit 2, and the data obtaining timing of the orientation sensor coincide with each other even when a setting change is performed.

Next, generation processing of generating sync signals to be supplied to the image capturing unit 2 and the orientation sensor using, as the reference of the synchronous timing, the exposure start time of the start line of an image captured by a rolling shutter image sensor will be described with reference to FIG. 12.

When the detection unit 505 detects that the image capturing unit 1 has output a sync signal corresponding to the frame (N−1), the generation unit 506 generates a "sync signal (external sync input) for controlling the start of exposure (for image capturing of the frame N) of the image capturing unit 2" after an offset 1201, and supplies it to the image capturing unit 2. The offset 1201 can be obtained by the calculation method described with reference to FIG. 10 (offset calculation method when the "exposure start time of the start line of an image captured by the image capturing unit 1 is set as the reference of the synchronous timing"). When the detection unit 505 detects that the image capturing unit 1 has output a sync signal corresponding to the frame (N−1), the generation unit 506 generates a "sync signal (external sync input) for controlling the start of measurement (for the frame N) of a position and orientation by the orientation sensor" after an offset 1203, and supplies it to the orientation sensor. The offset 1203 can be obtained by the calculation method described with reference to FIG. 10 (offset calculation method when the "exposure start time of the start line of an image captured by the image capturing unit 1 is set as the reference of the synchronous timing").

Assume that the setting unit 507 performs the setting (setting change 2) of changing the exposure time of the image capturing unit 2 until the detection unit 505 detects a sync signal corresponding to the frame N after detecting a sync signal corresponding to the frame (N−1).

Even if the setting change 2 is performed, the relationship between the exposure start time of the image capturing unit 1 and the processing time till the exposure start time after the external sync input of the image capturing unit 2 does not change, so the offset need not be changed.

Hence, when the detection unit 505 detects that the image capturing unit 1 has output a sync signal corresponding to the frame N, the generation unit 506 generates a "sync signal (external sync input) for controlling the start of exposure (for image capturing of the frame (N+1)) of the image capturing unit 2" after the offset 1201, and supplies it to the image capturing unit 2. Further, when the detection unit 505 detects that the image capturing unit 1 has output a sync signal corresponding to the frame N, the generation unit 506 generates a "sync signal (external sync input) for controlling the start of measurement (for the frame (N+1)) of a position and orientation by the orientation sensor" after the offset 1203, and supplies it to the orientation sensor.

Assume that the setting unit 507 performs the setting (setting change 1) of changing the exposure time of the image capturing unit 1 until the detection unit 505 detects a sync signal corresponding to the frame (N+1) after detecting a sync signal corresponding to the frame N.

At this time, when the detection unit 505 detects that the image capturing unit 1 has output a sync signal corresponding to the frame (N+1), the generation unit 506 generates a "sync signal (external sync input) for controlling the start of exposure (for image capturing of the frame (N+2)) of the image capturing unit 2" after an offset 1202, and supplies it to the image capturing unit 2. The offset 1202 can be obtained by a method similar to that of the offset 1201. Also, when the detection unit 505 detects that the image capturing unit 1 has output a sync signal corresponding to the frame (N+1), the generation unit 506 generates a "sync signal (external sync input) for controlling the start of measurement (for the frame (N+2)) of a position and orientation by the orientation sensor" after an offset 1204, and supplies it to the orientation sensor. The offset 1204 can be obtained by a method similar to that of the offset 1203.

Thereafter, no setting change by the setting unit 507 is performed, and no offset switching occurs. In this fashion, the synchronous control unit 901 supplies offsets to the generation unit 506 so that sync signals to be supplied to the image capturing unit 2 and the orientation sensor are generated based on the offsets corresponding to a setting change of the exposure time of the image capturing unit by the setting unit 507.

The above-described processing can be performed to implement a synchronous operation in which the exposure start time of the first line of an image captured by the image capturing unit 1, that of the first line of an image captured by the image capturing unit 2, and the data obtaining timing of the orientation sensor coincide with each other even when a setting change is performed.

In the case in which the synchronous timing is set at the exposure start time, offsets for generating external sync inputs to the image capturing unit 2 and the orientation sensor are changed only when the setting change 1 of the exposure time of the image capturing unit 1 is performed. This also applies to a case in which the synchronous timing is set not only at the exposure start time of the start line but also at the exposure start time of an arbitrary line. This can be utilized to simplify offset change processing when a setting change is performed, and reduce the processing load and circuit scale of the HMD 101.

Figure 13:
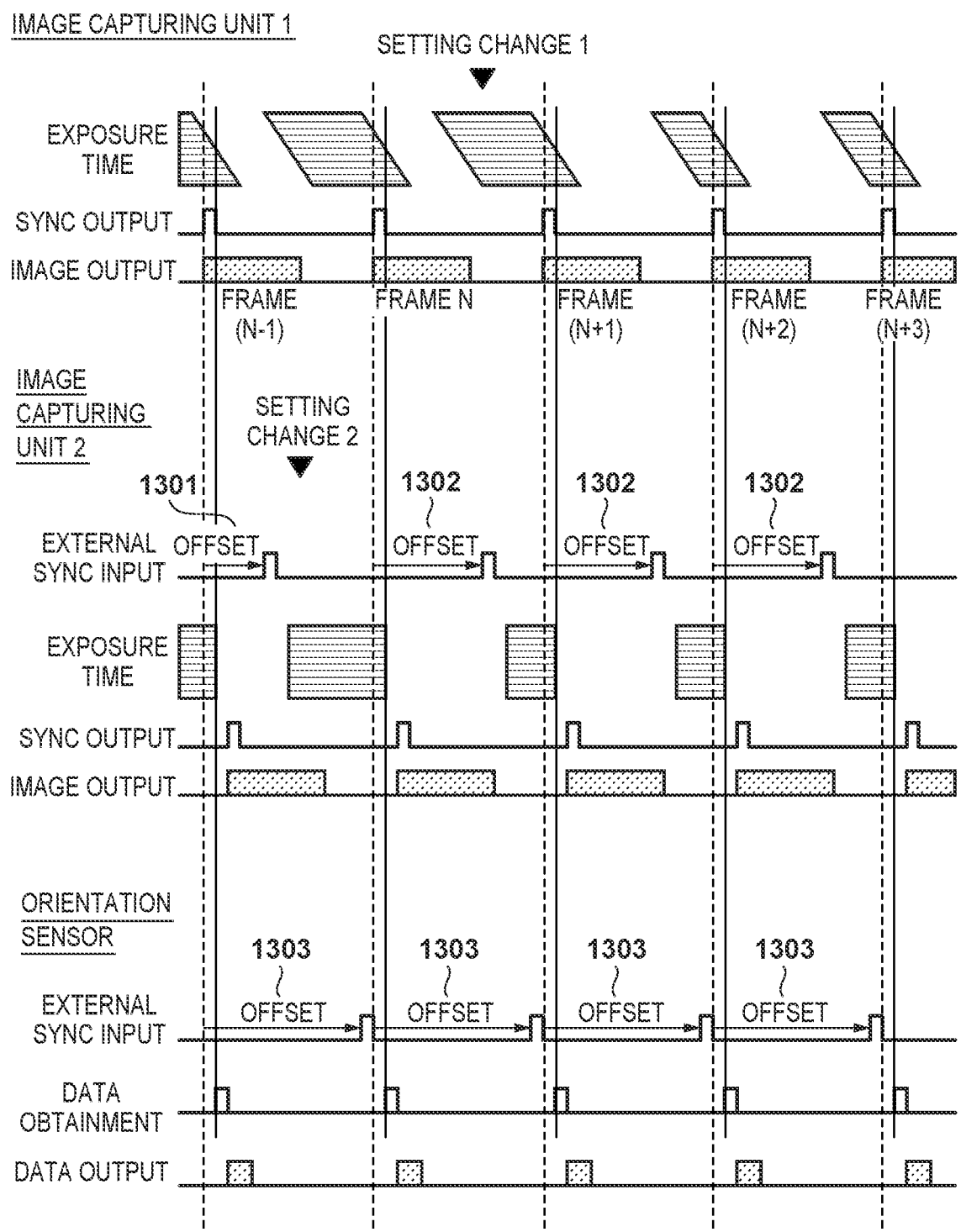
FIG. 13 is a timing chart for explaining generation processing of generating sync signals to be supplied to the image capturing unit 2 and the orientation sensor.

Next, generation processing of generating sync signals to be supplied to the image capturing unit 2 and the orientation sensor using, as the reference of the synchronous timing, the exposure end time of the center line of an image captured by a rolling shutter image sensor will be described with reference to FIG. 13.

When the detection unit 505 detects that the image capturing unit 1 has output a sync signal corresponding to the frame (N−1), the generation unit 506 generates a "sync signal (external sync input) for controlling the start of exposure (for image capturing of the frame N) of the image capturing unit 2" after an offset 1301, and supplies it to the image capturing unit 2. The offset 1301 can be obtained as a result of subtracting the "exposure time of the image capturing unit 2" and the "time t62" from a "time till the exposure end time of the center line of an image captured by the image capturing unit 1 after the detection timing of the sync signal of the image capturing unit 1". When the detection unit 505 detects that the image capturing unit 1 has output a sync signal corresponding to the frame (N−1), the generation unit 506 generates a "sync signal (external sync input) for controlling the start of measurement (for the frame N) of a position and orientation by the orientation sensor" after an offset 1303, and supplies it to the orientation sensor. The offset 1303 can be obtained as a result of subtracting the "processing time $t_{Sens\_Ready}$" from a "time till the exposure end time of the center line of an image captured by the image capturing unit 1 after the detection timing of the sync signal of the image capturing unit 1".

Assume that the setting unit 507 performs the setting (setting change 2) of changing the exposure time of the image capturing unit 2 until the detection unit 505 detects a sync signal corresponding to the frame N after detecting a sync signal corresponding to the frame (N−1).

At this time, when the detection unit 505 detects that the image capturing unit 1 has output a sync signal corresponding to the frame N, the generation unit 506 generates a "sync signal (external sync input) for controlling the start of exposure (for image capturing of the frame (N+1)) of the image capturing unit 2" after an offset 1302, and supplies it to the image capturing unit 2. The offset 1302 can be obtained by a method similar to that of the offset 1301. Further, when the detection unit 505 detects that the image capturing unit 1 has output a sync signal corresponding to the frame N, the generation unit 506 generates a "sync signal (external sync input) for controlling the start of measurement (for the frame (N+1)) of a position and orientation by the orientation sensor" after the offset 1303, and supplies it to the orientation sensor.

Assume that the setting unit 507 performs the setting (setting change 1) of changing the exposure time of the image capturing unit 1 until the detection unit 505 detects a sync signal corresponding to the frame (N+1) after detecting a sync signal corresponding to the frame N.

At this time, when the detection unit 505 detects that the image capturing unit 1 has output a sync signal corresponding to the frame (N+1), the generation unit 506 generates a "sync signal (external sync input) for controlling the start of exposure (for image capturing of the frame (N+2)) of the image capturing unit 2" after the offset 1302, and supplies it to the image capturing unit 2. Also, when the detection unit 505 detects that the image capturing unit 1 has output a sync signal corresponding to the frame (N+1), the generation unit 506 generates a "sync signal (external sync input) for controlling the start of measurement (for the frame (N+2)) of a position and orientation by the orientation sensor" after the offset 1303, and supplies it to the orientation sensor.

After that, no setting change by the setting unit 507 is performed, and no offset switching occurs. In this manner, the synchronous control unit 901 supplies offsets to the generation unit 506 so that sync signals to be supplied to the image capturing unit 2 and the orientation sensor are generated based on the offsets corresponding to a setting change of the exposure time of the image capturing unit by the setting unit 507.

The above-described processing can be performed to implement a synchronous operation in which the exposure end time of the center line of an image captured by the image capturing unit 1, that of the center line of an image captured by the image capturing unit 2, and the data obtaining timing of the orientation sensor coincide with each other even when a setting change is performed.

In the case in which the synchronous timing is set at the exposure end time, an offset for generating an external sync input to the image capturing unit 2 is changed only when the setting change 2 of the exposure time of the image capturing unit 2 is performed. In addition, in the case in which the synchronous timing is set at the exposure end time, an offset for generating an external sync input to the orientation sensor is not changed. This also applies to a case in which the synchronous timing is set not only at the exposure end time of the center line but also at the exposure end time of an arbitrary line. This can be utilized to simplify offset change processing when a setting change is performed, and reduce the processing load and circuit scale of the HMD 101.

Further, in the case in which the synchronous timing is set at the exposure end time, the cycle of the sync output and image output of the image capturing unit 2 and the cycle of the data output of the orientation sensor become advantageously constant in synchronization with the cycle of the sync output and image output of the image capturing unit 1. This also applies to a case in which the synchronous timing is set not only at the exposure end time of the center line but also at the exposure end time of an arbitrary line.

Figure 11:
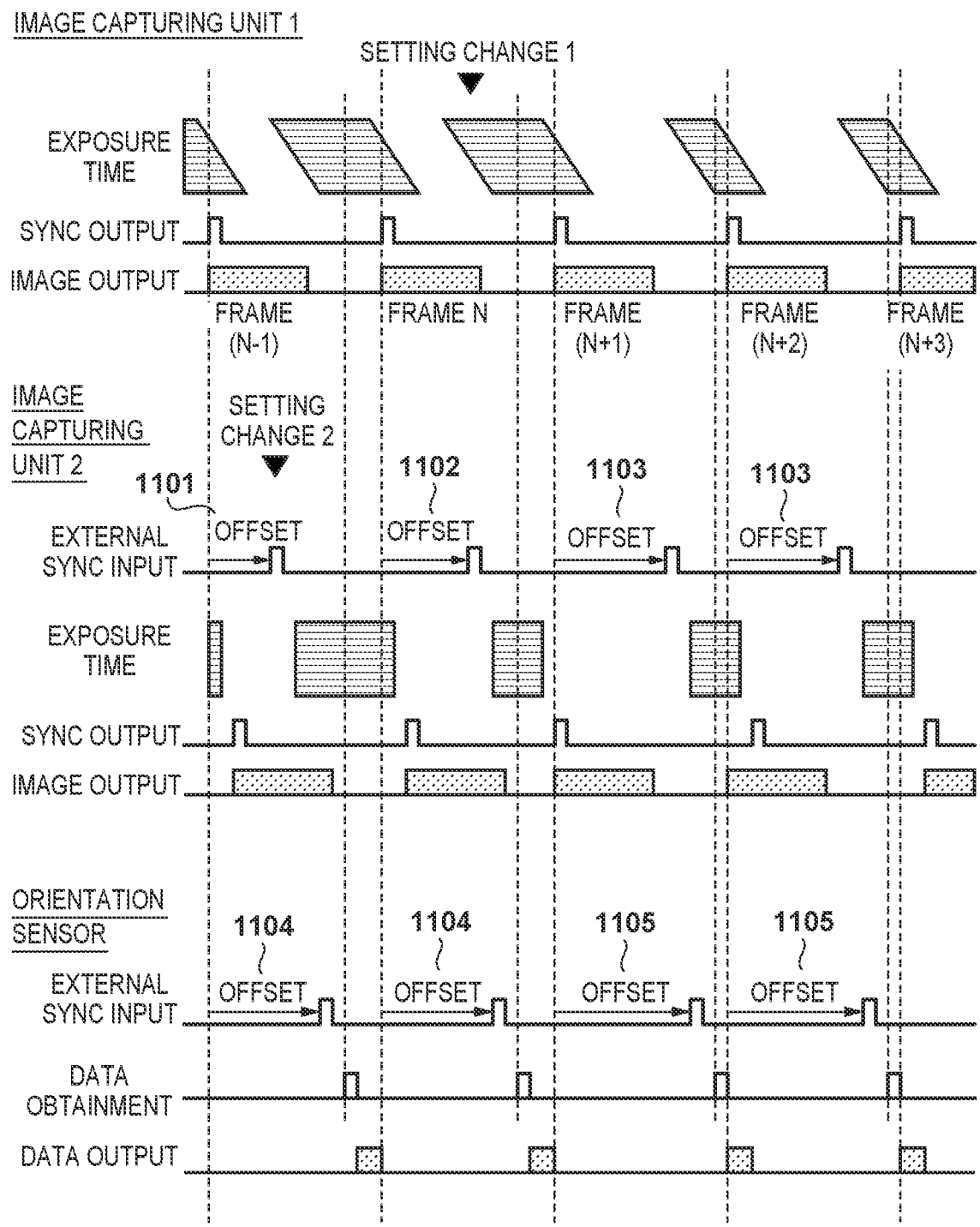
FIG. 11 is a timing chart for explaining generation processing of generating sync signals to be supplied to the image capturing unit 2 and the orientation sensor.
Figure 12:
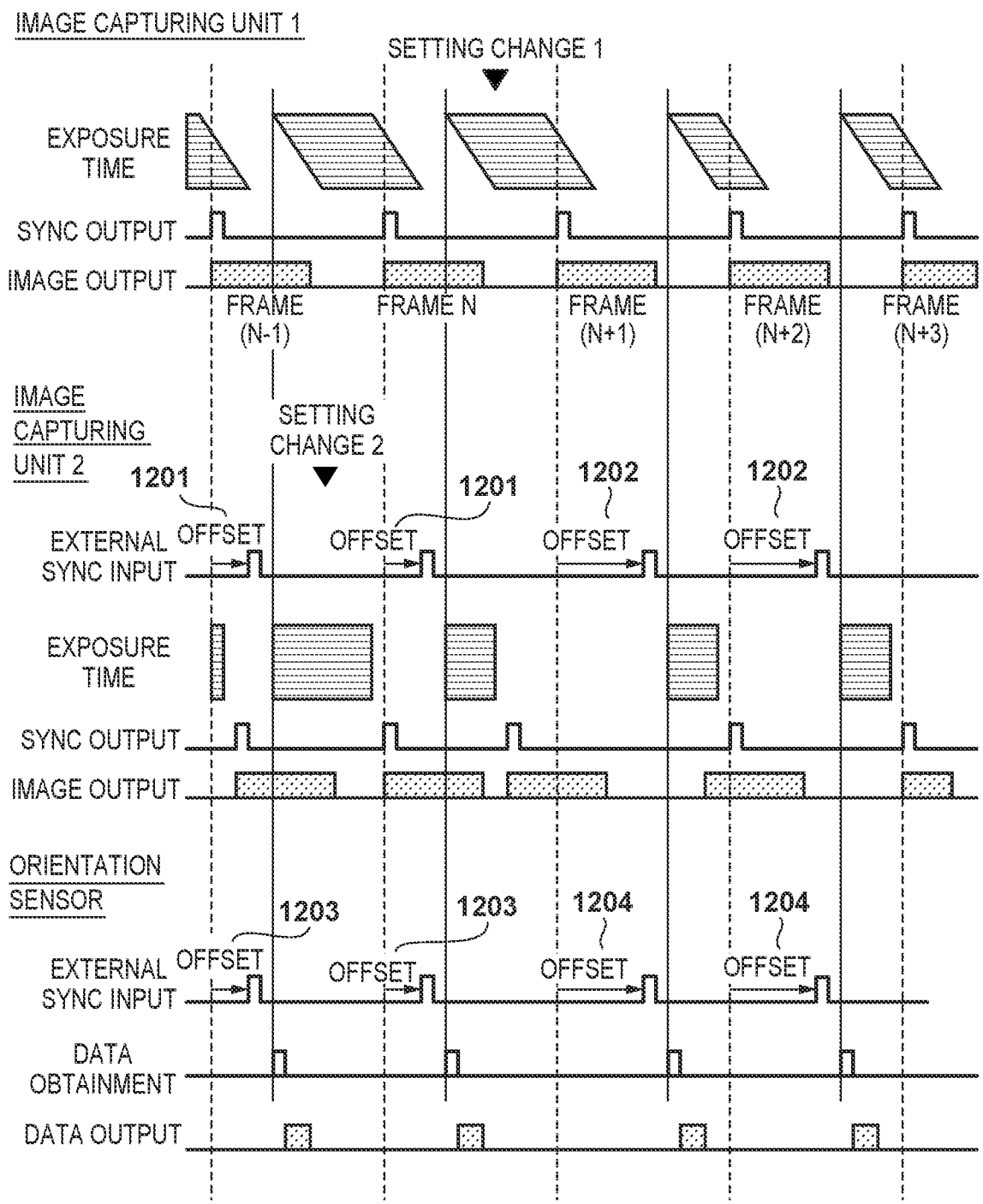
FIG. 12 is a timing chart for explaining generation processing of generating sync signals to be supplied to the image capturing unit 2 and the orientation sensor.

For example, it can be confirmed in FIGS. 11 and 12 that when the setting change 1 of the image capturing unit 1 and the setting change 2 of the image capturing unit 2 are performed, the cycle of the sync output and image output of the image capturing unit 2 and the cycle of the data output of the orientation sensor vary. If a captured image is not output in a constant cycle, an IC (Integrated Circuit) corresponding to such an output cycle needs to be selected as a subsequent captured image processing unit. Also, a frame memory or the like needs to be added to adjust the image cycle constant. To the contrary, when a captured image is output in a constant cycle, as shown in FIG. 13, the choice of subsequent captured image processing units is widened, and no frame memory for cycle adjustment is required.

Control of the synchronous operation of the image capturing unit 501, the image capturing unit 502, and the orientation sensor 503 by the HMD 101 according to the embodiment will be described with reference to the flowchart of FIG. 14. In step S1401, the synchronous control unit 901 determines whether the setting unit 507 has performed a setting change as described above.

If it is determined that the setting unit 507 has performed a setting change as described above, the process advances to step S1402. If the setting unit 507 has not performed a setting change as described above, the process advances to step S1407.

In step S1402, the synchronous control unit 901 obtains from the setting unit 507 the setting of which line of an image captured by which capturing unit to set as the reference of the synchronous timing. In step S1403, the synchronous control unit 901 obtains from the setting unit 507 the setting of which time in the exposure time to set as the reference of the synchronous timing.

In step S1404, the synchronous control unit 901 obtains from the setting unit 507 the settings (including at least parameters regarding the image capturing unit 1 necessary to obtain an offset) of the image capturing unit 1. As described with reference to FIG. 13, when the reference line of the synchronous timing does not change and the reference exposure time is the exposure end time, the obtaining processing in step S1404 may be skipped because the exposure time setting of the image capturing unit 1 does not influence the decision of an offset.

In step S1405, the synchronous control unit 901 obtains from the setting unit 507 the settings (including at least parameters regarding the image capturing unit 2 necessary to obtain an offset) of the image capturing unit 2. As described with reference to FIG. 12, when the reference line of the synchronous timing does not change and the reference start time is the exposure start time, the obtaining processing in step S1405 may be skipped because the exposure time setting of the image capturing unit 2 does not influence the decision of an offset.

In step S1406, the synchronous control unit 901 performs the above-described processing based on the pieces of information obtained in steps S1402 to S1406, obtaining an offset corresponding to the image capturing unit 2 and an offset corresponding to the orientation sensor.

In step S1407, it is determined whether the detection unit 505 has detected a sync signal (sync output) from the image capturing unit 501. If it is determined that the detection unit 505 has detected a sync signal (sync output) from the image capturing unit 501, the process advances to step S1408. If it is determined that the detection unit 505 has not detected a sync signal (sync output) from the image capturing unit 501, the process returns to step S1401.

In step S1408, if the generation unit 506 receives from the detection unit 505 a notification that the sync signal (sync output) has been received from the image capturing unit 501, it generates a "sync signal to be supplied to the image capturing unit 502" after the offset corresponding to the image capturing unit 2 from the detection timing of the sync signal, and supplies the generated sync signal to the image capturing unit 502. Further, the generation unit 506 generates a "sync signal to be supplied to the orientation sensor 503" after the offset corresponding to the orientation sensor 503 from the detection timing of the sync signal, and supplies the generated sync signal to the orientation sensor 503.

As described above, according to the second embodiment, the synchronous operation of the image capturing unit 501, the image capturing unit 502, and the orientation sensor 503 can be implemented. In addition, a setting change of the exposure time of the image capturing unit 501 or 502 or a setting change of the exposure timing can be coped with. Since the image capturing and data obtaining timings of the respective devices coincide with an arbitrary timing in the exposure time, a more real MR experience free from misalignment between a captured image and an image of the virtual space can be provided.

Third Embodiment

The functional units in the HMD 101 and the image processing apparatus 104 shown in FIG. 5 or 9 may be implemented by hardware, or some functional units may be implemented by software (computer program).

In the latter case, the image capturing unit 501, the image capturing unit 502, the orientation sensor 503, the display unit 504, and the I/F 508 in the HMD 101 may be implemented by hardware, and the remaining functional units may be implemented by software. In this case, the software is stored in the memory of the HMD 101 and executed by the processor of the HMD 101 to implement the functions of corresponding functional units.

Figure 15A:
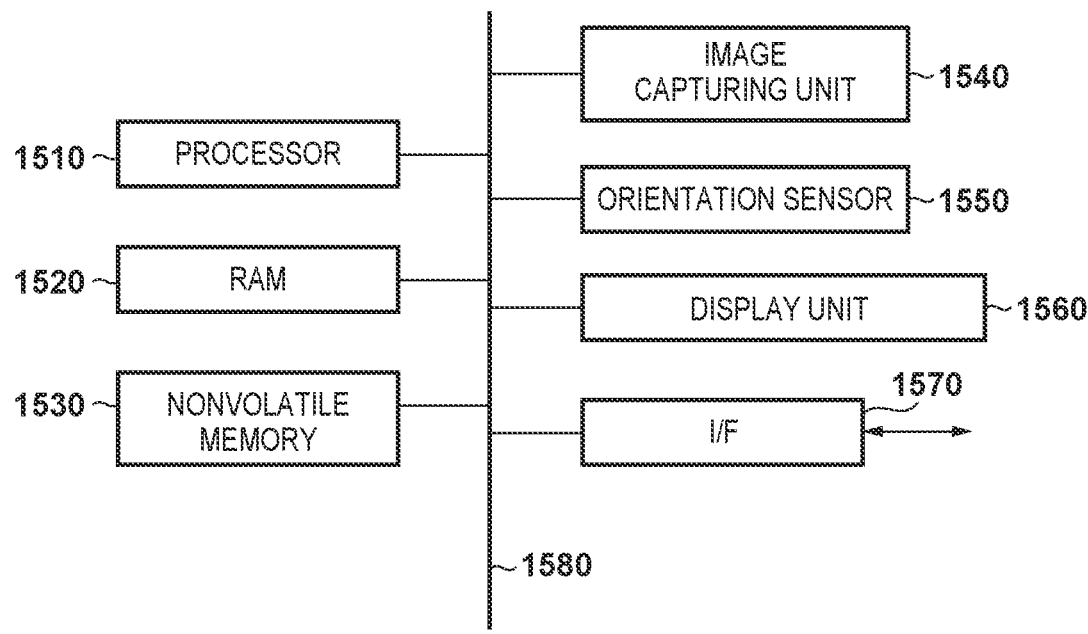
FIG. 15A is a block diagram exemplifying the hardware arrangement of the HMD 101.

The hardware arrangement of an HMD 101 will be exemplified with reference to the block diagram of FIG. 15A. A processor 1510 executes various processes using computer programs and data stored in a RAM 1520. By these processes, the processor 1510 controls the operation of the whole HMD 101, and executes or controls each process that is performed by the HMD 101 in the above description.

The RAM 1520 has an area for storing computer programs and data loaded from a nonvolatile memory 1530, and an area for storing data received from an image processing apparatus 104 via an I/F 1570. Further, the RAM 1520 has a work area used when the processor 1510 executes various processes. The RAM 1520 can properly provide various areas.

The nonvolatile memory 1530 stores computer programs and data for causing the processor 1510 to execute or control the operation of the HMD 101. The computer programs stored in the nonvolatile memory 1530 include computer programs for causing a CPU 1501 to execute the functions of the functional units (except image capturing units 501 and 502, an orientation sensor 503, a display unit 504, and an I/F 508) of the HMD 101 shown in FIG. 5 or 9. The computer programs and data stored in the nonvolatile memory 1530 are properly loaded to the RAM 1520 under the control of the processor 1510, and processed by the processor 1510.

An image capturing unit 1540 includes the above-described image capturing units 501 and 502. An orientation sensor 1550 includes the above-described orientation sensor 503. A display unit 1560 includes the above-described display unit 504. The I/F 1570 includes the above-described I/F 508. All the processor 1510, the RAM 1520, the nonvolatile memory 1530, the image capturing unit 1540, the orientation sensor 1550, the display unit 1560, and the I/F 1570 are connected to a bus 1580. Note that the arrangement shown in FIG. 15A is an example of the arrangement applicable to the HMD 101 and can be properly changed/deformed.

As for the image processing apparatus 104, any computer apparatus capable of executing software corresponding to functional units except an 1F 509 and a content DB 512 is applicable to the image processing apparatus 104. The hardware arrangement of the computer apparatus applicable to the image processing apparatus 104 will be exemplified with reference to the block diagram of FIG. 15B.

The CPU 1501 executes various processes using computer programs and data stored in a RAM 1502 and a ROM 1503. The CPU 1501 controls the operation of the whole computer apparatus, and executes or controls each process that is performed by the computer apparatus-applied image processing apparatus 104 in the above description.

The RAM 1502 has an area for storing computer programs and data loaded from the ROM 1503 and an external storage device 1506, and an area for storing data received from the HMD 101 via the I/F 1507. In addition, the RAM 1502 has a work area used when the CPU 1501 executes various processes. The RAM 1502 can properly provide various areas. The ROM 1503 stores setting data, startup programs, and the like of the computer apparatus.

An operation unit 1504 is a user interface including a keyboard, a mouse, a touch panel, and the like. By operating the operation unit 1504, the user can input various instructions to the CPU 1501.

A display unit 1505 is formed from a liquid crystal screen, a touch panel screen, or the like, and can display the result of processing of the CPU 1501 using an image or a text. Note that the display unit 1505 may be a projection apparatus such as a projector that projects an image or a text.

The external storage device 1506 is a mass information storage device such as a hard disk drive. The external storage device 1506 stores an OS (Operating System). The external storage device 1506 stores computer programs and data for causing the CPU 1501 to execute the functions of the functional units (except an I/F 509 and the content DB 512) of the image processing apparatus 104 shown in FIG. 5 or 9. The external storage device 1506 also includes the above-described content DB 512.

The computer programs and data stored in the external storage device 1506 are properly loaded to the RAM 1502 under the control of the CPU 1501, and processed by the CPU 1501.

An/F 1507 is a communication interface for performing data communication with the HMD 101 and functions as the above-described I/F 509. That is, the computer apparatus performs data communication with the HMD 101 via the I/F 1507.

Figure 15B:
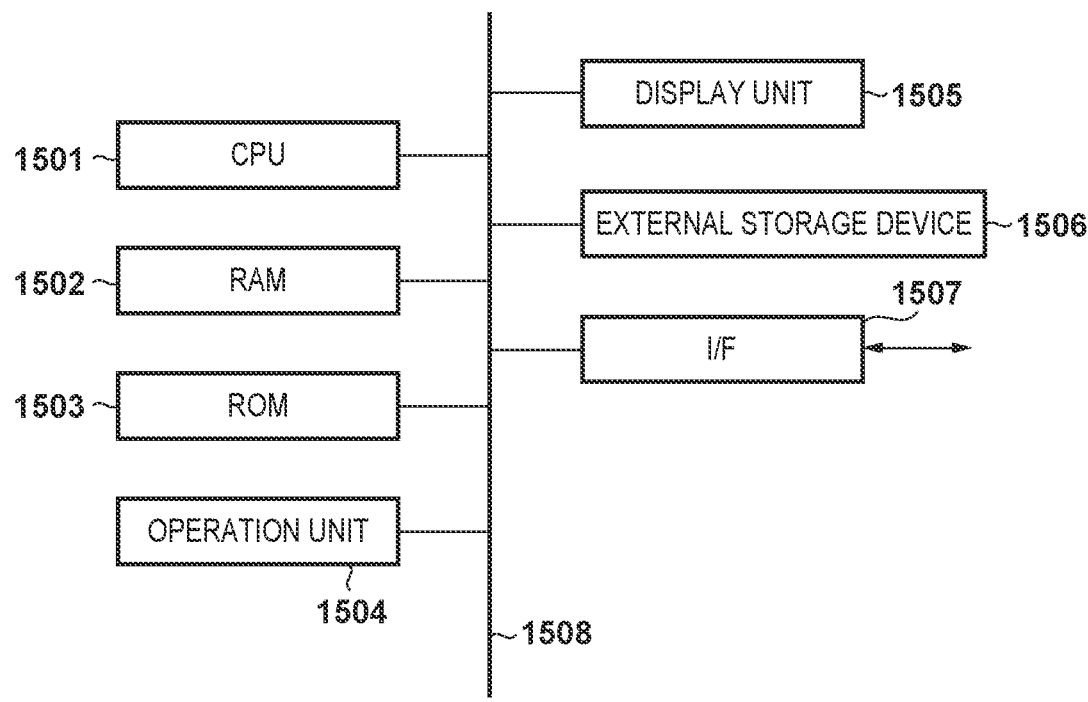
FIG. 15B is a block diagram exemplifying the hardware arrangement of a computer apparatus.

All the CPU 1501, the RAM 1502, the ROM 1503, the operation unit 1504, the display unit 1505, the external storage device 1506, and the I/F 1507 are connected to a bus 1508. Note that the arrangement shown in FIG. 15B is an example of the arrangement applicable to the image processing apparatus 104 and can be properly changed/deformed.

Fourth Embodiment

In each of the above-described embodiments, a marker artificially arranged in the physical space is used to obtain the position and orientation of an image capturing unit. However, in addition to or instead of the marker, a natural feature (for example, the corner of furniture such as a chair or desk, or the corner of a building, car, or the like forming a landscape) originally present in the physical space may be used to obtain the position and orientation of an image capturing unit.

The arrangement of the MR system shown in FIG. 5 or 9 is merely an example. For example, a plurality of apparatuses may share and execute processes that are performed by the HMD 101 in the above description, or share and execute processes that are performed by the image processing apparatus 104 in the above description.

Instead of a head mounted display device, a "portable device including one or more image capturing units, an orientation sensor, and a display device" such as a smartphone may be used. Also, such a portable device may be added to the MR system together with the head mounted display device. In this case, an image processing apparatus 104 generates an image of the mixed reality space corresponding to the position and orientation of the head mounted display device, and distributes it to the head mounted display device. Further, the image processing apparatus 104 generates an image of the mixed reality space corresponding to the position and orientation of the portable device, and distributes it to the portable device. A method of generating an image of the mixed reality space is the same as those in the above-described embodiments.

For example, a smartphone has an application that superimposes and displays AR (Augmented Reality) information on video based on a feature amount (for example, natural feature or QR Code®) detected from an image captured by the image capturing unit. In some cases, orientation information of the smartphone itself detected by the orientation sensor is reflected in the AR display form. In such a case, the smartphone serves as a synchronous control apparatus to synchronize another device in accordance with the exposure time of the image capturing unit, as in the above-described embodiments. This can implement high-precision synchronous processing.

The HMD 101 and the image processing apparatus 104 may be integrated. Instead of the head mounted display device, the portable device and the image processing apparatus 104 may be integrated.

In the above-described embodiments, the HMD 101 includes the orientation sensor 503. However, the present invention is not limited to this, and necessary information may be obtained from an image captured by an objective camera installed near the wearer of the HMD 101.

Numerical values, arithmetic methods, processing execution timings, and the like used in the above-described embodiments are merely examples for concrete descriptions, and it is not intended to limit the embodiments to these examples.

Some or all of the above-described embodiments may be combined and used. Some or all of the above-described embodiments may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-009447 filed Jan. 23, 2020, which is hereby incorporated by reference herein in its entirety.

What is claimed is:

1. A synchronous control apparatus comprising:
   a first setting unit configured to set a first offset, wherein the first offset is based on a time till a reference of a synchronous timing after a detection timing of a start signal representing a start timing of image output from a first image capturing unit, a time required for a second image capturing unit to start exposure after receiving a first synchronous signal, and an exposure time of one frame in the second image capturing unit;
   a second setting unit configured to set a second offset, wherein the second offset is based on the time till the reference of the synchronous timing after the detection timing of the start signal, and a time required for a sensor to start measurement after receiving a second synchronous signal;
   a first supply unit configured to, in a case where the start signal is detected, generate the first synchronous signal after the first offset from the detection timing of the start signal to supply the generated first synchronous signal to the second image capturing unit; and
   a second supply unit configured to, in a case where the start signal is detected, generate the second synchronous signal after the second offset from the detection timing of the start signal to supply the generated second synchronous signal to the sensor.

2. The synchronous control apparatus according to claim 1, wherein the first image capturing unit captures an image by a first shutter method, and the second image capturing unit captures an image by a second shutter method different from the first shutter method.

3. The synchronous control apparatus according to claim 1, wherein the first image capturing unit is a device having no input function of a synchronous signal.

4. The synchronous control apparatus according to claim 1, wherein when one of an exposure time of the first image capturing unit and an exposure time of the second image capturing unit is changed, the first setting unit obtains the first offset based on the changed exposure time.

5. The synchronous control apparatus according to claim 1, wherein in a case where the time till the reference of the synchronous timing after the detection timing of the start signal is t61, the time required for the second image capturing unit to start the exposure after receiving the first synchronous signal is t62, and the exposure time of the one frame in the second image capturing unit is t63, the first setting unit sets (t61−t62−t63/2) as the first offset.

6. The synchronous control apparatus according to claim 1, wherein when one of an exposure time of the first image capturing unit and an exposure time of the second image capturing unit is changed, the second setting unit obtains the second offset based on the changed exposure time.

7. The synchronous control apparatus according to claim 1, further comprising:
   an obtaining unit configured to obtain a composite image of an image of a virtual space generated based on an image captured by the second image capturing unit and a position and orientation measured by the sensor, and an image captured by the first image capturing unit; and
   a display unit configured to display the composite image.

8. The synchronous control apparatus according to claim 1, wherein the reference of the synchronous timing is one of an exposure start time of a start line of an image captured by the first image capturing unit, an exposure center time of a center line of an image captured by the first image capturing unit, and an exposure end time of a final line of an image captured by the first image capturing unit.

9. The synchronous control apparatus according to claim 1, wherein the synchronous control apparatus is a head mounted display device which includes the first image capturing unit, the second image capturing unit, and the sensor.

10. The synchronous control apparatus according to claim 2, wherein the first shutter method is a rolling shutter method, and the second shutter method is a global shutter method.

11. A method comprising:
  setting a first offset, wherein the first offset is based on a time till a reference of a synchronous timing after a detection timing of a start signal representing a start timing of image output from a first image capturing unit, a time required for a second image capturing unit to start exposure after receiving a first synchronous signal, and an exposure time of one frame in the second image capturing unit;
  setting a second offset, wherein the second offset is based on the time till the reference of the synchronous timing after the detection timing of the start signal, and a time required for a sensor to start measurement after receiving a second synchronous signal;
  in a case where the start signal is detected, generating, the first synchronous signal after the first offset from the detection timing of the start signal to supply the generated first synchronous signal to the second image capturing unit; and
  in a case where the start signal is detected, generating the second synchronous signal after the second offset from the detection timing of the start signal to supply the generated second synchronous signal to the sensor.

12. A system comprising a synchronous control apparatus and an image processing apparatus,
  the synchronous control apparatus including:
    a first setting unit configured to set a first offset, wherein the first offset is based on a time till a reference of a synchronous timing after a detection timing of a start signal representing a start timing of image output from a first image capturing unit, a time required for a second image capturing unit to start exposure after receiving a first synchronous signal, and an exposure time of one frame in the second image capturing unit;
    a second setting unit configured to set a second offset, wherein the second offset is based on the time till the reference of the synchronous timing after the detection timing of the start signal, and a time required for a sensor to start measurement after receiving a second synchronous signal;
    a first supply unit configured to, in a case where the start signal is detected, generate the first synchronous signal after the first offset from the detection timing of the start signal to supply the generated first synchronous signal to the second image capturing unit; and
    a second supply unit configured to, in a case where the start signal is detected, generate the second synchronous signal after the second offset from the detection timing of the start signal to supply the generated second synchronous signal to the sensor, and the image processing apparatus including:
    an obtaining unit configured to obtain, from the synchronous control apparatus, an image captured by the first image capturing unit, an image captured by the second image capturing unit in response to reception of the first synchronous signal, and the measurement measured by the sensor in response to reception of the second synchronous signal;
    a unit configured to generate an image of a virtual space based on the image captured by the second image capturing unit and the measurement measured by the sensor, and generate a composite image of the generated image of the virtual space and the image captured by the first image capturing unit; and
    a unit configured to output the composite image to the synchronous control apparatus.

13. The system according to claim 12, wherein the synchronous control apparatus is a head mounted display device which includes the first image capturing unit, the second image capturing unit, the sensor, and a display unit configured to display the composite image.

14. The synchronous control apparatus according to claim 1, wherein in a case where the time till the reference of the synchronous timing after the detection timing of the start signal is t61, and the time required for the sensor to start the measurement after receiving the second synchronous signal is t64, the second setting unit sets (t61−t64) as the second offset.

* * * * *